(12) United States Patent
Campbell et al.

(10) Patent No.: US 11,318,405 B2
(45) Date of Patent: May 3, 2022

(54) AIR CLEANER ASSEMBLIES AND METHODS OF USE

(71) Applicant: DONALDSON COMPANY, INC., Minneapolis, MN (US)

(72) Inventors: Steven K. Campbell, Lakeville, MN (US); Robert D. Johnston, Lakeville, MN (US); Daniel E. Adamek, Bloomington, MN (US)

(73) Assignee: Donaldson Company, Inc., Bloomington, MN (US)

( * ) Notice: Subject to any disclaimer, the term of this patent is extended or adjusted under 35 U.S.C. 154(b) by 900 days.

(21) Appl. No.: 15/625,683

(22) Filed: Jun. 16, 2017

(65) Prior Publication Data

US 2017/0361260 A1    Dec. 21, 2017

Related U.S. Application Data

(60) Provisional application No. 62/351,723, filed on Jun. 17, 2016.

(51) Int. Cl.
*B01D 46/24* (2006.01)
*B01D 46/10* (2006.01)
(Continued)

(52) U.S. Cl.
CPC ...... *B01D 46/2411* (2013.01); *B01D 46/0006* (2013.01); *B01D 46/008* (2013.01);
(Continued)

(58) Field of Classification Search
None
See application file for complete search history.

(56) References Cited

U.S. PATENT DOCUMENTS 5,030,264 A    7/1991    Klotz et al.
5,472,463 A   12/1995    Herman et al.
(Continued)

FOREIGN PATENT DOCUMENTS

DE    100 55 732 A1    3/2002
DE    103 50 119 B3    1/2005
(Continued)

OTHER PUBLICATIONS

International Search Report and Written Opinion for Application No. PCT/US2017/037994 dated Sep. 18, 2017.
(Continued)

*Primary Examiner* — Christopher P Jones
*Assistant Examiner* — Brit E. Anbacht
(74) *Attorney, Agent, or Firm* — Merchant & Gould P.C.

(57) ABSTRACT

Air cleaner assemblies, related methods, components therefor, and features thereof are described. In depicted examples, the air cleaner assemblies and components optionally use advantageous housing seal features. In some examples, a filter cartridge for an air cleaner includes a media pack extending along a longitudinal axis between opposite inlet and outlet flow ends and defining an outer perimeter with opposite straight sides and a first curved end. The filter cartridge can include a seal arrangement circumscribing the media pack outer perimeter, wherein a portion of the seal arrangement extends beyond a first plane defined by the media pack outlet flow end and a portion of the seal arrangement is disposed between the first plane and a second plane defined by the media pack inlet flow end, wherein the seal arrangement is aligned along a third plane disposed at an oblique angle to the first and second planes.

12 Claims, 23 Drawing Sheets

(51) Int. Cl.
  *B01D 46/00* (2006.01)
  *B01D 50/00* (2006.01)
  *B01D 46/04* (2006.01)
  *B01D 46/52* (2006.01)

(52) U.S. Cl.
  CPC ......... *B01D 46/0043* (2013.01); *B01D 46/04* (2013.01); *B01D 46/10* (2013.01); *B01D 46/521* (2013.01); *B01D 50/002* (2013.01); *B01D 2265/06* (2013.01); *B01D 2271/022* (2013.01); *B01D 2271/027* (2013.01); *B01D 2279/60* (2013.01)

(56) References Cited

U.S. PATENT DOCUMENTS

| | | |
|---|---|---|
| 5,494,497 A | 2/1996 | Lee |
| 5,545,241 A | 8/1996 | Vanderauwera et al. |
| 5,613,992 A | 3/1997 | Engel |
| 5,772,883 A | 6/1998 | Rothman et al. |
| D396,098 S | 7/1998 | Gillingham et al. |
| 5,792,247 A | 8/1998 | Gillingham et al. |
| D398,046 S | 9/1998 | Gillingham et al. |
| D399,944 S | 10/1998 | Gillingham et al. |
| 5,820,646 A | 10/1998 | Gillingham et al. |
| 5,895,574 A | 4/1999 | Friedmann et al. |
| 5,902,364 A | 5/1999 | Tokar et al. |
| 6,039,778 A | 3/2000 | Coulonvaux |
| D428,128 S | 7/2000 | Gillingham et al. |
| 6,179,890 B1 | 1/2001 | Ramos et al. |
| D437,401 S | 2/2001 | Ramos et al. |
| 6,190,432 B1 | 2/2001 | Gieseke et al. |
| 6,210,469 B1 | 4/2001 | Tokar |
| 6,235,195 B1 | 5/2001 | Tokar |
| 6,350,296 B1 | 2/2002 | Warner |
| 6,375,700 B1 * | 4/2002 | Jaroszczyk ............ B01D 46/10 210/493.2 |
| 6,673,136 B2 | 1/2004 | Gillingham et al. |
| 6,808,547 B2 | 10/2004 | Ota et al. |
| 7,004,986 B2 | 2/2006 | Kopec et al. |
| 7,341,613 B2 | 3/2008 | Kirsch |
| 7,494,017 B2 | 2/2009 | Miller |
| 7,625,419 B2 | 12/2009 | Nelson et al. |
| 7,942,423 B2 | 5/2011 | Kondo et al. |
| 7,959,700 B2 | 6/2011 | Kidman |
| 8,034,145 B2 * | 10/2011 | Boehrs ............... B01D 46/0005 55/502 |
| 8,152,876 B2 | 4/2012 | Gillenberg et al. |
| 8,216,332 B2 | 7/2012 | Kopec et al. |
| 8,273,145 B2 | 9/2012 | Banks et al. |
| 8,318,251 B2 | 11/2012 | Cavanaugh et al. |
| 8,343,245 B2 | 1/2013 | Coulonvaux et al. |
| 8,382,876 B2 * | 2/2013 | Widerski ............ B01D 46/525 55/521 |
| 8,496,723 B2 * | 7/2013 | Reichter ............ B01D 46/0005 55/503 |
| RE44,424 E | 8/2013 | Barnwell |
| 8,668,756 B2 * | 3/2014 | Zou ................. F02M 35/02425 55/503 |
| 8,888,882 B2 | 11/2014 | Ackermann et al. |
| 8,916,044 B2 | 12/2014 | Rapin |
| RE45,588 E | 6/2015 | Engelland et al. |
| 9,101,864 B2 | 8/2015 | Neef et al. |
| 9,127,625 B2 | 9/2015 | Kaiser |
| 9,162,172 B2 | 10/2015 | Nepsund et al. |
| 9,180,399 B2 | 11/2015 | Reichter et al. |
| 9,283,507 B2 | 3/2016 | Coulonvaux et al. |
| 9,295,936 B2 | 3/2016 | Krisko et al. |
| D770,026 S | 10/2016 | Morgan et al. |
| 9,623,351 B2 * | 4/2017 | Kindkeppel ....... B01D 46/0002 |
| 9,638,147 B2 | 5/2017 | Hasenfratz et al. |
| 2004/0020177 A1 | 2/2004 | Ota et al. |
| 2004/0187689 A1 | 9/2004 | Sporre et al. |
| 2005/0130508 A1 | 6/2005 | Yeh |
| 2005/0229561 A1 * | 10/2005 | Nepsund ............. B01D 46/42 55/481 |
| 2008/0047240 A1 | 2/2008 | Trautmann et al. |
| 2008/0148695 A1 | 6/2008 | Terres et al. |
| 2008/0276582 A1 * | 11/2008 | Boehrs ............... B01D 46/0005 55/497 |
| 2008/0307759 A1 * | 12/2008 | Reichter ............ B01D 46/0005 55/428 |
| 2009/0126324 A1 * | 5/2009 | Smith ................... F01M 13/04 55/385.3 |
| 2010/0000413 A1 | 1/2010 | Turner et al. |
| 2010/0034646 A1 | 2/2010 | Magara et al. |
| 2010/0064646 A1 | 3/2010 | Smith et al. |
| 2013/0199143 A1 | 8/2013 | Zou et al. |
| 2013/0200575 A1 | 8/2013 | Humblot et al. |
| 2014/0250843 A1 | 9/2014 | Krull et al. |
| 2015/0075126 A1 | 3/2015 | Schmid et al. |
| 2015/0176544 A1 * | 6/2015 | Kaufmann ......... B01D 46/0023 55/425 |
| 2015/0306530 A1 * | 10/2015 | Reichter ............ B01D 46/0005 55/485 |
| 2016/0061159 A1 | 3/2016 | Ryon et al. |
| 2016/0230716 A1 * | 8/2016 | Finn .................. B01D 46/0005 |
| 2017/0095761 A1 | 4/2017 | Knight et al. |
| 2017/0096973 A1 | 4/2017 | Kaufmann et al. |
| 2017/0165601 A1 | 6/2017 | Wuebbeling et al. |
| 2017/0304760 A1 | 10/2017 | Kaufmann et al. |
| 2017/0361260 A1 | 10/2017 | Campbell et al. |
| 2018/0257017 A1 * | 9/2018 | Adamek ............ B01D 46/526 |
| 2018/0345196 A1 * | 12/2018 | Campbell .......... B01D 46/0004 |
| 2019/0046915 A1 * | 2/2019 | Gieseke ............ F02M 35/0201 |

FOREIGN PATENT DOCUMENTS

| | | |
|---|---|---|
| DE | 20 2008 017 059 U1 | 6/2010 |
| DE | 10 2006 039 952 B4 | 12/2012 |
| DE | 10 2014 008 704 B3 | 12/2015 |
| EP | 1 008 375 A1 | 6/2000 |
| EP | 0 932 515 B2 | 5/2001 |
| EP | 1 166 843 A1 | 1/2002 |
| EP | 1 611 937 A1 | 1/2006 |
| EP | 1 843 035 | 8/2012 |
| EP | 2 247 359 | 8/2014 |
| JP | 6-67852 | 9/1994 |
| JP | 11-82193 A | 3/1999 |
| JP | 11-132117 | 5/1999 |
| JP | 2001-329921 A | 11/2001 |
| JP | 2003-120815 A | 4/2003 |
| WO | 2004/007054 A1 | 1/2004 |
| WO | 2004/082795 A2 | 9/2004 |
| WO | 2005/077487 A1 | 8/2005 |
| WO | 2014/164145 A1 | 10/2014 |
| WO | 2016/030037 A1 | 3/2016 |
| WO | 2016/077377 A1 | 5/2016 |
| WO | 2017/079191 A1 | 5/2017 |
| WO | 2017133796 | 8/2017 |

OTHER PUBLICATIONS

International Search Report and Written Opinion for Application No. PCT/US2018/036119 dated Mar. 1, 2019.

* cited by examiner

AIR CLEANER ASSEMBLIES AND METHODS OF USE

CROSS REFERENCE TO RELATED APPLICATIONS

This application claims priority to U.S. Application Ser. No. 62/351,723 filed with the United States Patent and Trademark Office on Jun. 17, 2016. The entire disclosure of U.S. Application Ser. No. 62/351,723 is incorporated herein by reference.

TECHNICAL FIELD

The present invention relates to filter arrangements, typically for use in filtering air, such as intake air for internal combustion engines, and more particularly relates to filter assemblies that include multiple components arranged in a housing to provide desired filtering capabilities.

BACKGROUND

Air or other gas filtering is desirable in a number of systems. A typical application is in the filtration of intake air to internal combustion engines. Another is in the filtration of crankcase ventilation filter assemblies. Typically, such systems comprise filter assemblies having a serviceable filter cartridge therein. After a period of use, filter media within a filter housing requires servicing, either through cleaning or complete replacement. Typically, for an air cleaner or crankcase ventilation filter assembly used with an internal combustion engine, for example, on a vehicle, the filter media is contained in a removable and replaceable, i.e. serviceable, component, typically referred as a filter element or cartridge. The filter cartridge is configured to be removably sealed within the air cleaner, in use. Improvements in filter arrangements relating to assembly, serviceability, and/or use are desirable. The filter cartridge can be provided as a first (e.g., primary) filter cartridge or a second (e.g., secondary or safety) filter cartridge. The air cleaner assembly can contain only a first filter cartridge or both a first filter cartridge and a second filter cartridge.

SUMMARY

Filter assemblies (such as air cleaner assemblies or crankcase ventilation filter assemblies) and components therefor; and, features thereof are described. Also described are methods of assembly and use. The filter assemblies generally comprise a housing having a filter cartridge removably positioned therein. An exemplary filter cartridge is depicted which has a housing seal surface comprising an obliquely angled axially directed surface extending in a perimeter around an open volume.

In one example, an air filter cartridge is disclosed that includes a media pack configured for installation into an air cleaner housing. The media pack extends along a longitudinal axis between opposite inlet and outlet flow ends and defines an outer perimeter. The air filter cartridge can include a circumferential shell surrounding at least a portion of the media pack outer perimeter. In alternative arrangements, no shell is provided. In one arrangement, the shell only partially covers the media pack outer perimeter. In one aspect, the circumferential shell can be provided with at least one engagement surface, for example two engagement surfaces, for receiving a closing force from an external component of the housing. In one example, the engagement surface is generally disposed orthogonally to the media pack outlet face. The air filter cartridge can additionally include a seal arrangement circumscribing at least a portion of the circumferential shell. The seal arrangement is generally disposed at a non-orthogonal/non-parallel or oblique angle to the engagement surface such that the closing force causes the seal arrangement to from an axial seal against a sealing component of the air cleaner housing. In some examples, a portion of the seal arrangement extends beyond a first plane defined by the media pack outflow end and a portion of the seal arrangement is disposed between planes defining the media pack inlet and outlet flow ends. Such a construction allows for a filter cartridge to be side or top loaded into the housing while maintaining a continuous seal around the media pack and while allowing the required sealing force to be generated from a direction transverse to the longitudinal axis of the filter cartridge.

There is no specific requirement that an air cleaner assembly, component therefor, or feature thereof include all of the detail characterized herein, to obtain some advantage according to the present disclosure.

BRIEF DESCRIPTION OF THE DRAWINGS

The present invention will be further explained with reference to the appended Figures, wherein like structure is referred to by like numerals throughout the several views, and wherein.

DETAILED DESCRIPTION

Herein, example filter assemblies, filter cartridges, features and components therefor are described and depicted. A variety of specific features and components are characterized in detail. Many can be applied to provide advantage. There is no specific requirement that the various individual features and components be applied in an overall assembly with all of the features and characteristics described, however, in order to provide for some benefit in accord with the present disclosure.

It is noted that a plurality of embodiments are depicted and described. The embodiments are not meant to be exclusive with respect to features depicted. That is, selected features of one embodiment can be applied in one or more of the other embodiments if desired, to advantage. In many examples, the filter assembly depicted is an air cleaner assembly, for example, used to filter intake air for an internal combustion engine. Additional applications are possible, for example, applications in which the filter assembly is a crankcase ventilation filter assembly, in which the filter cartridge is used to filter crankcase blowby gases which include, typically, both particulate and liquid contaminant therein. Both type of filter assemblies are generally "gas filter assemblies," since the carrier stage being filtered is gas (air or crankcase ventilation gases). While the techniques described herein will typically be used in application for gas filtration, they can be used in the filtration of other materials, for example, liquids, if desired.

Figure 1:
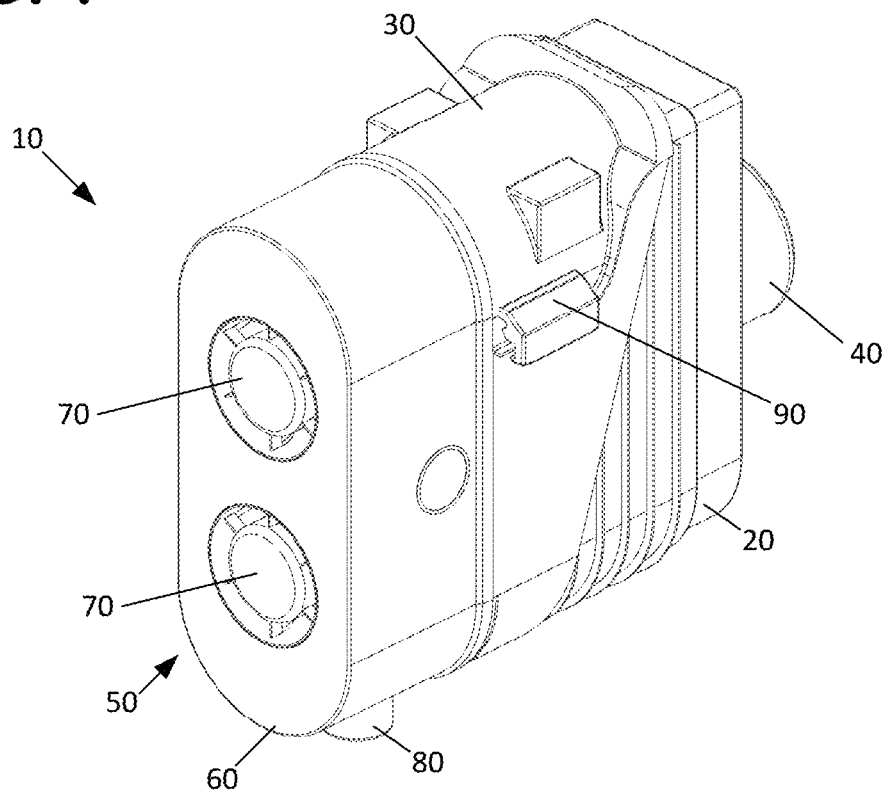
FIG. 1 is a rear perspective view of an air cleaner assembly according to the present disclosure.

Referring now to the Figures, wherein the components are labeled with like numerals throughout the several Figures, FIG. 1 is a perspective view of an air cleaner 10 in accordance with an embodiment of the invention. The air cleaner 10 includes a housing 20 defining an interior region 20a within which a primary removable filter cartridge 100 and a secondary removable filter cartridge 150 is disposed. The air cleaner assembly 10 further includes an air inlet end 50 through which air to be filtered enters the assembly 10. The air cleaner assembly 10 further includes an outlet 40 that is positioned for exit of filtered air. The outlet 40 can be made separately from the housing 20 and attached thereto, or it can be integrally constructed as a portion of the housing 20.

Figure 3:
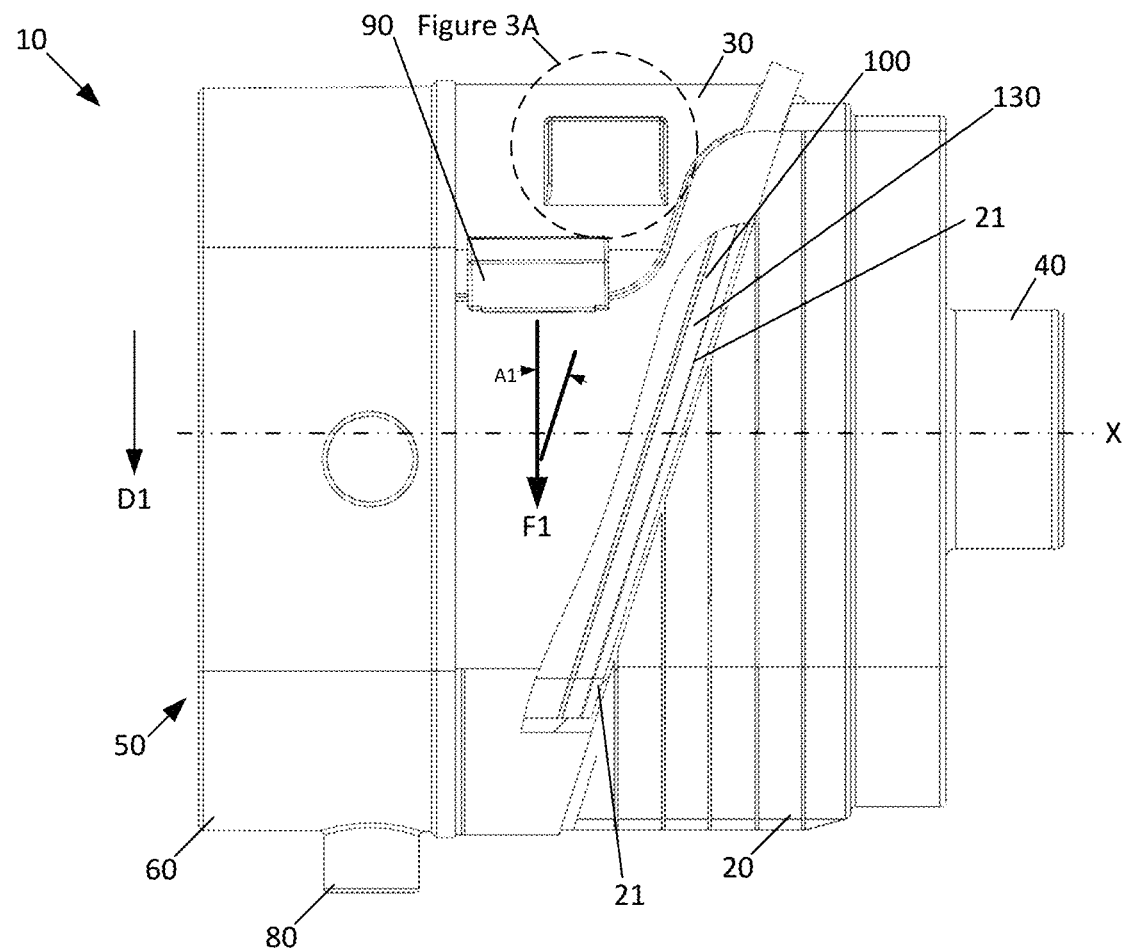
FIG. 3 is a side view of the air cleaner assembly shown in FIG. 1, with a portion of the housing cut away to show the filter element contained within the housing.
Figure 6:
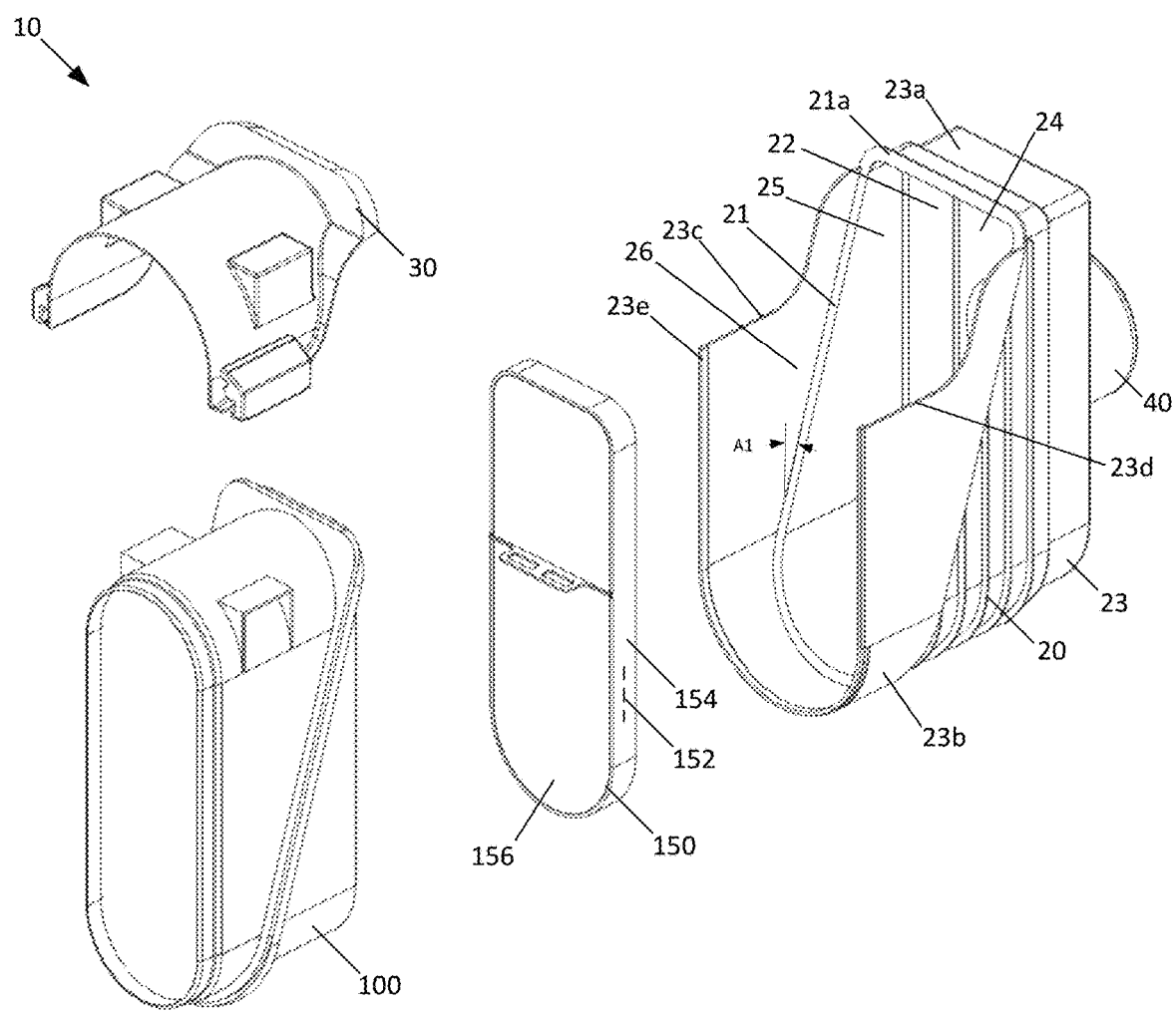
FIG. 6 is an exploded rear perspective view of the air cleaner assembly shown in FIG. 1 with the precleaner removed.
Figure 7:
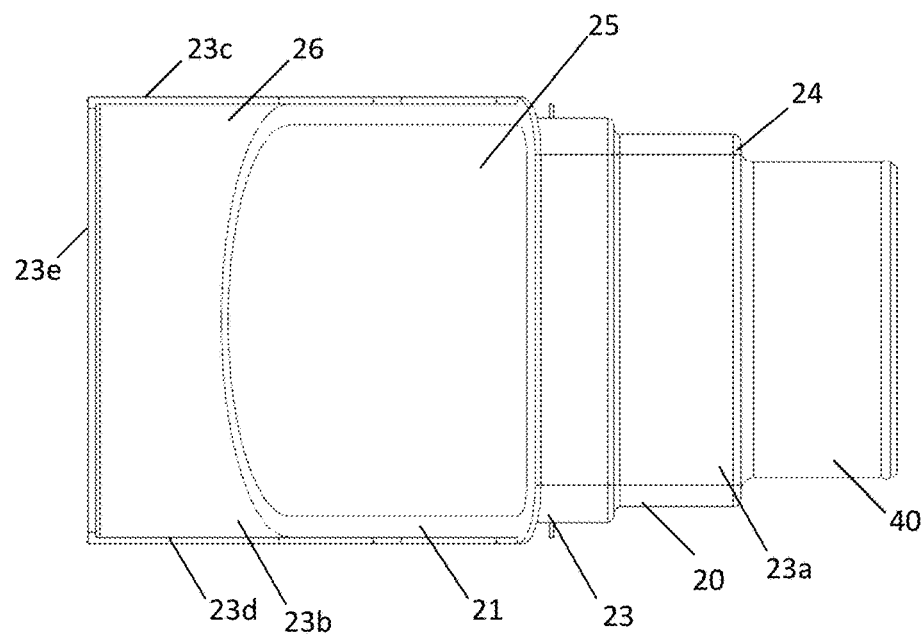
FIG. 7 is a top view of the housing of the air cleaner assembly shown in FIG. 1.
Figure 8:
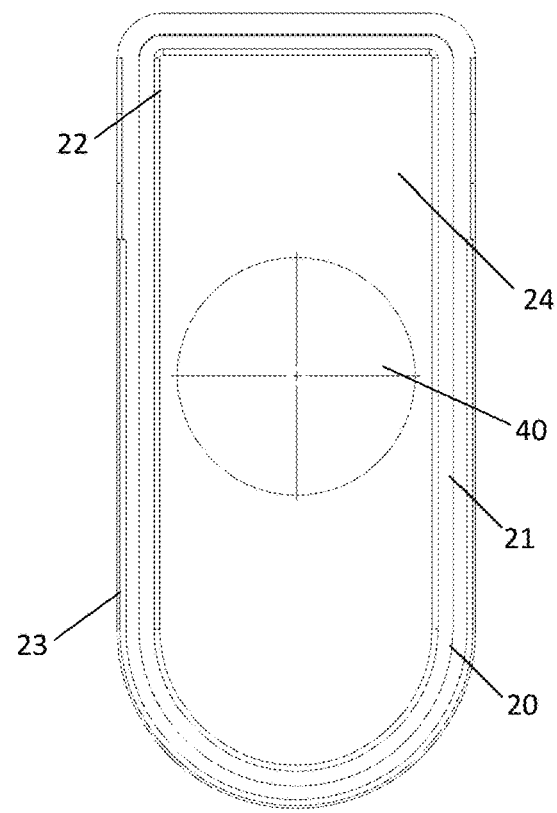
FIG. 8 is an end view of the housing of the air cleaner assembly shown in FIG. 1.
Figure 9:
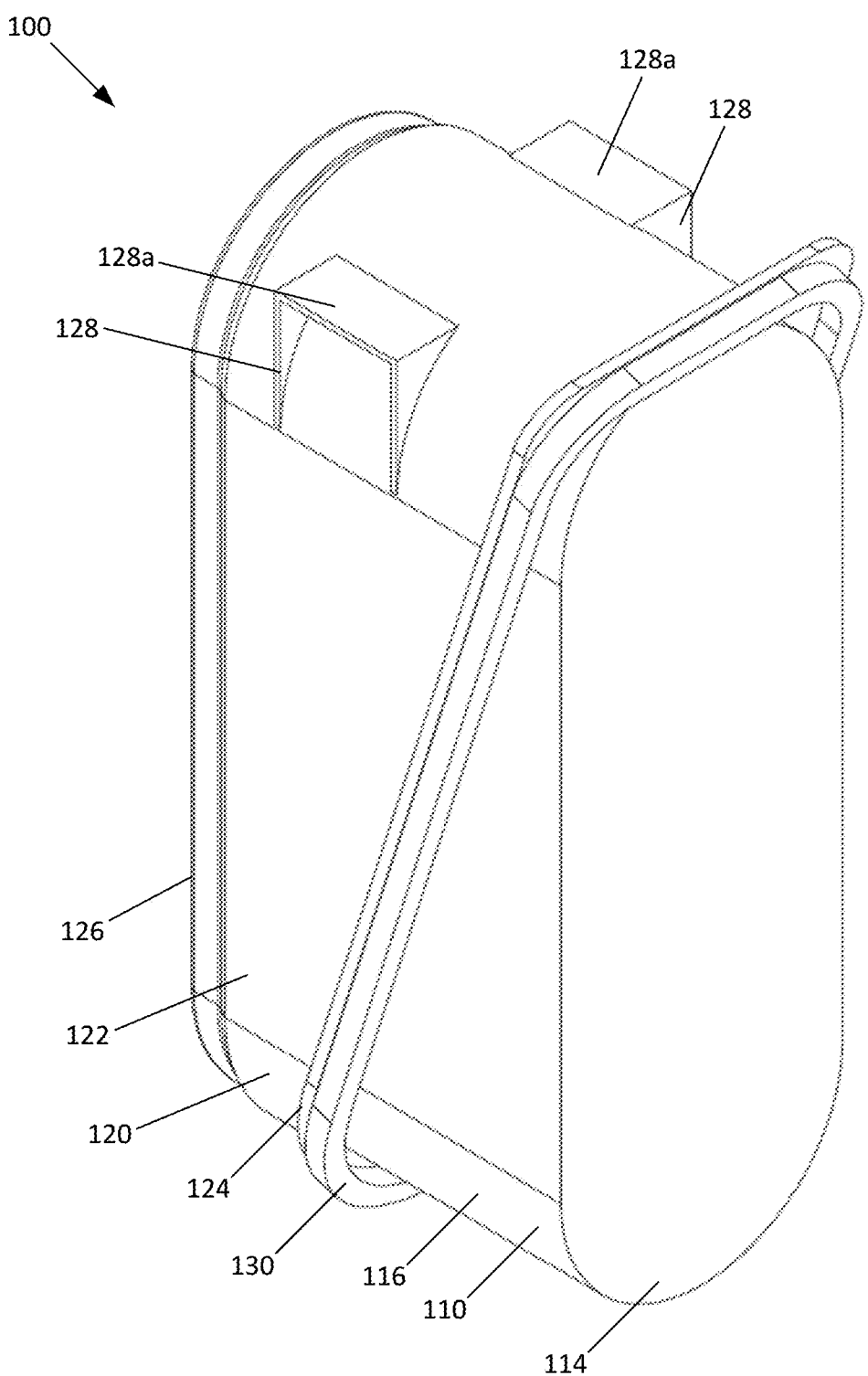
FIG. 9 is a front perspective view of the filter cartridge shown in FIG. 5.
Figure 10:
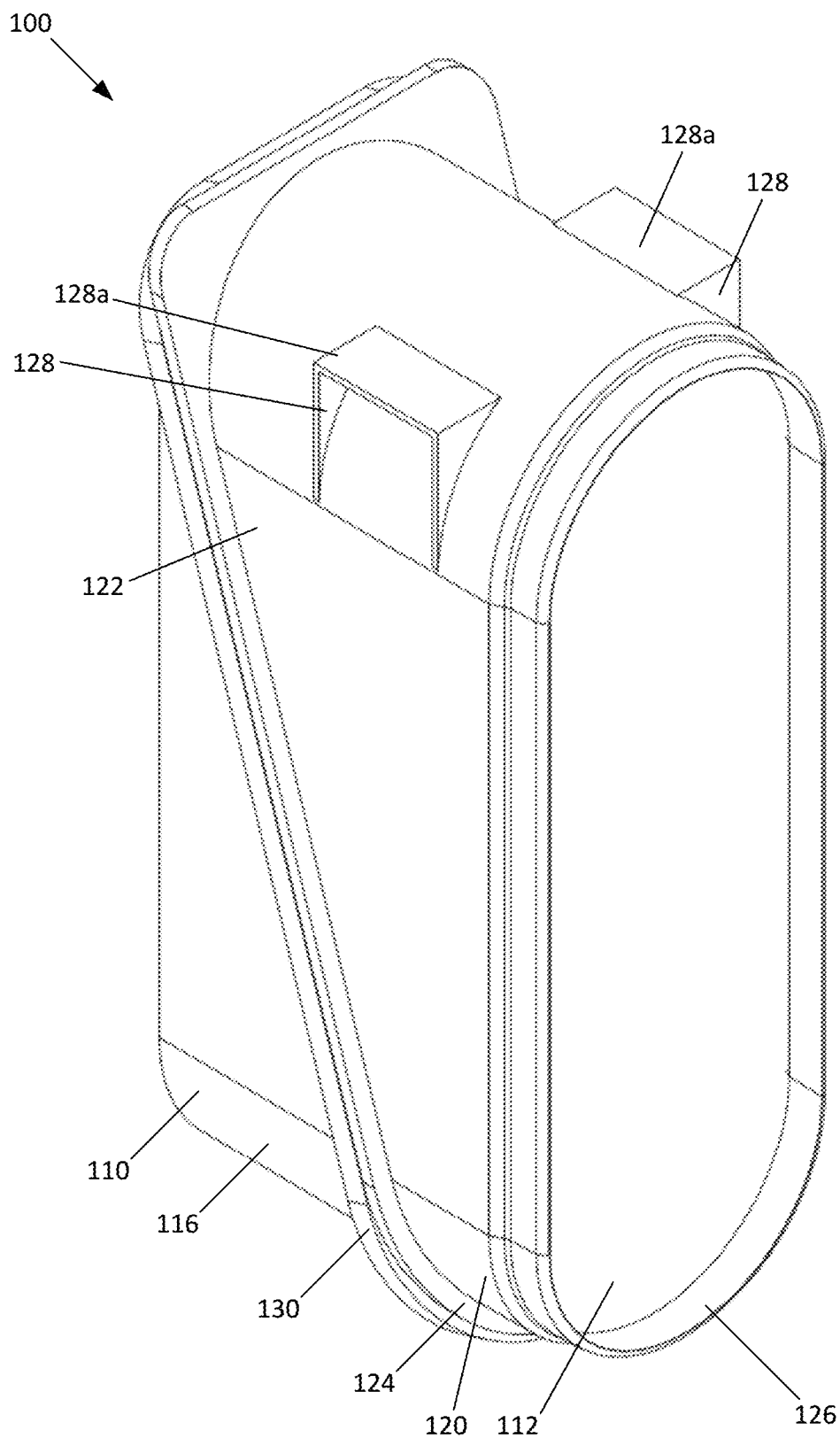
FIG. 10 is rear perspective view of the filter cartridge shown in FIG. 9.

As most easily seen at FIGS. 6 and 7, the housing 20 includes a first sealing surface 21 against which a corresponding seal member 130 of the filter cartridge 100 forms a seal along a first sealing plane coincident with the first sealing surface 21. The housing also includes a second sealing surface 22 against which a corresponding seal 152 of the filter cartridge 150 forms a seal. The first sealing surface 21 generally faces the air inlet end 50 and is disposed at a non-parallel or oblique angle A1 to the air inlet end 50 and to a longitudinal axis X of the air cleaner assembly 10, as schematically indicated at FIGS. 3 and 6. In one example, the angle A1 is between 5 and 45 degrees. In one example, the angle A1 is between 5 and 20 degrees. In one example, the angle A1 is between 5 and 15 degrees. In one example, the angle A1 is about 10 degrees. In one example, the angle A1 is about 18 degrees. The second sealing surface 22 is defined by a perimeter wall 23 of the housing 20. A first portion 23a of the perimeter wall 23 extends between the first sealing surface 21 and an end wall 24. The outlet 40 is defined within the end wall 24. In one aspect, the perimeter wall first portion 23a forms a closed shape such that a "clean side" interior volume 25 is formed between the first sealing surface 21 and the outlet 40 when the filter cartridge 100 is sealed against the first sealing surface 21. On the opposite side of the first sealing surface 21, the perimeter wall 23 defines a second portion 23b that extends between side edges 23c, 23d to define an open side 26 for enabling the filter cartridges 100, 150 to be received into the interior region 20a of the housing 20. The open side 26 can also be referred to as an access opening or side opening in the perimeter wall of the housing 20. As shown, the side edges 23c, 23d have a curved profile forming a complementary shape to corresponding edges of a cover assembly 30, discussed later. The perimeter wall 23 terminates at an end edge 23e which is configured for attachment to the below described precleaner 60.

In one aspect, the air cleaner assembly 10 can be characterized as a top-load, side-load, or transverse-load assembly as the installation direction D1 of the filter cartridge 100, discussed below) is transverse or orthogonal to the longitudinal axis of the air cleaner assembly 10 and because the filter cartridge 100 is inserted into the housing 20 at a location between the inlet 50 and outlet 40 via the open side 26. Although the major portion of the open side 26 is shown as being provided on the short or narrow side (i.e. along the minor axis of the housing or the top of the housing, as shown in the drawings) of the housing 20, the major portion of the open side 26 could be provided on the long or wide side (i.e. along the major axis of the housing or the sides of the housing, as shown in the drawings) of the housing 20.

In one aspect, the air cleaner assembly 10 illustrated is a two-stage air cleaner assembly that includes a precleaner 60 adjacent to its inlet end 50. The precleaner 60 generally is used to clean selected material or contaminants carried by an air stream into the air cleaner assembly 10 before the air reaches the filter cartridge positioned therein. The precleaner generally includes a plurality of separator tubes 70 or centrifugal separators that receive air and spin the air in order to remove large particulates, and then permit precleaned air to exit the precleaner. The separator tubes 70 can be viewed most easily at FIG. 5A. The pre-cleaned air from the precleaner outlet 62 then flows into the inlet flow face of the filter cartridge 100. A scavenge port or outlet 80 can be provided for removal of the separated large particulates. In the embodiment shown in FIG. 1, two separator tubes 70 are provided. The air cleaner assembly 10 may be provided without a precleaner assembly, such that the air cleaner assembly 10 is a single stage assembly with a primary only filter cartridge 100 or with a primary and secondary filter cartridge 100, 150.

In one aspect, the air cleaner 10 can include an access cover 30 to provide access to the inner region 20a of the housing 20, such as for placement and removal of filter cartridges 100, 150. When installed, the access cover 30 closes the open side 26 such that the interior region 20a is fully enclosed. Taken together, the access cover 30, the precleaner 60, the perimeter wall second portion 23b, and the upstream side of the filter cartridge 100 form a "dirty side" interior volume 27 within which the incoming air has not yet been filtered by the filter cartridge 100, but has passed through the precleaner 60. The access cover 30 may be a separate component or may be an integral feature of another component of the air cleaner 10. In the embodiment disclosed herein, the access cover 30 is a component separate from the housing 20 and the filter cartridge 100. In other examples, the access cover 30 is integral to the air filter cartridge 100.

As most easily seen at FIGS. 16-22, the access cover 30 has a sidewall 32 extending between flanged side edges 32a, 32b and between a front-end edge 32c and a rear-end edge 32d. When the access cover 30 is installed onto the housing 20, the cover side edges 32a, 32b engage with the housing side edges 23c, 23d; the cover front-end edge 32c extends over the housing first sealing surface 21; and the cover rear-end edge 32d engages with the precleaner 60 to enclose the interior region 20a of the air cleaner assembly 10.

Figure 2:
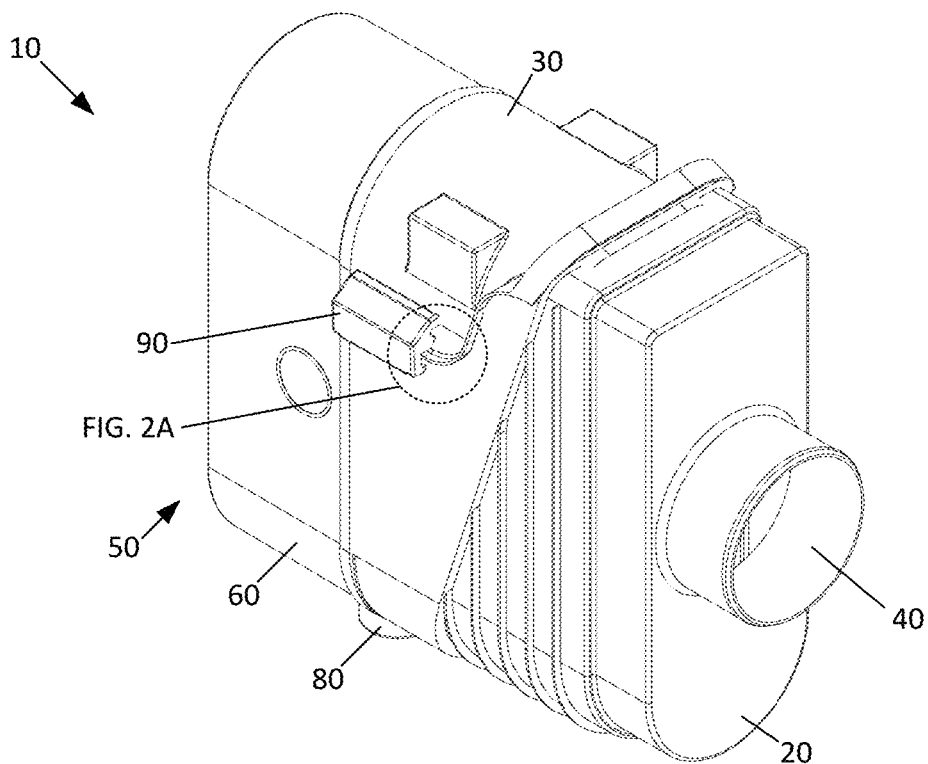
FIG. 2 is a front perspective view of the air cleaner assembly shown in FIG. 1.
Figure 2A:
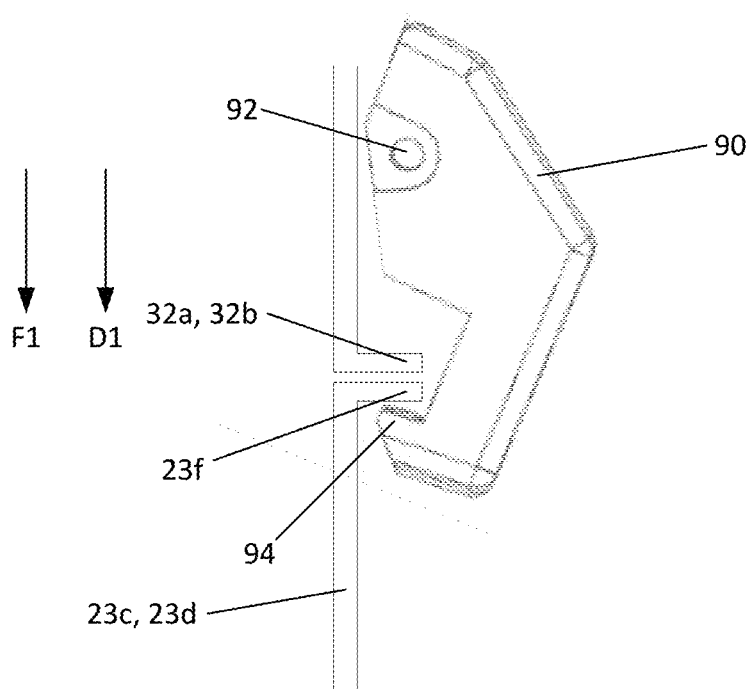
FIG. 2A is a cross-sectional enlarged portion of the air cleaner assembly show in FIG. 1 and as indicated at FIG. 2.

In the illustrated embodiment, the access cover 30 is attachable to and removable from the housing 20 by connecting and disconnecting multiple connectors (e.g., lock mechanisms, latch mechanisms, etc.) 90 that are mounted to the housing 20 and engage with the access cover 30. In the illustrated embodiment, two connectors 90 are symmetrically positioned on opposite the flanged edges 32a, 32b of the access cover 30. In one aspect, each of the connectors 90 is rotatably mounted onto the access cover 30 via a hinge member 92 and includes a latch portion 94 that engages with the side edges 32c, 23d of the housing 20. In one example, as most easily seen at FIG. 2A, the side edges 23c, 23d include a flange extension 23f for engaging with the connector latch portion 94. In one example, the side edges 23c, 23d include a recess portion into which the connector latch portions 94 extend. The connectors 90, once moved to the latched position, exert a closing or clamping force F1 in a direction D1 to draw the access cover 30 down onto the housing 20, as schematically shown at FIG. 3. In one aspect, the direction D1 is orthogonal to the longitudinal axis X of the filter assembly 10. In one aspect, the direction D1 of the clamping force F1 is at a non-parallel or oblique angle A1 to the housing sealing surface 21, as schematically indicated at FIG. 3. In one aspect, the direction D1 is parallel to the inlet and outlet flow faces of the filter cartridges 100, 150. In one aspect, the direction D1 is parallel to the insertion direction of the filter cartridge 100 into the interior region 20a of the housing 20.

Figure 3A:
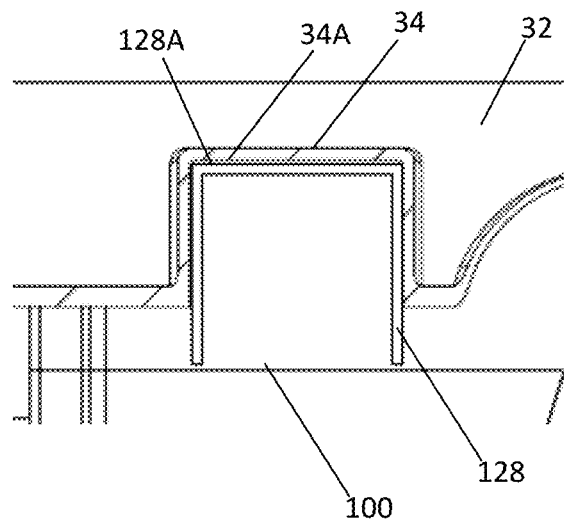
FIG. 3A is a cross-sectional side view of a portion of the air cleaner assembly shown in FIG. 1, as indicated at FIG. 3.
Figure 4:
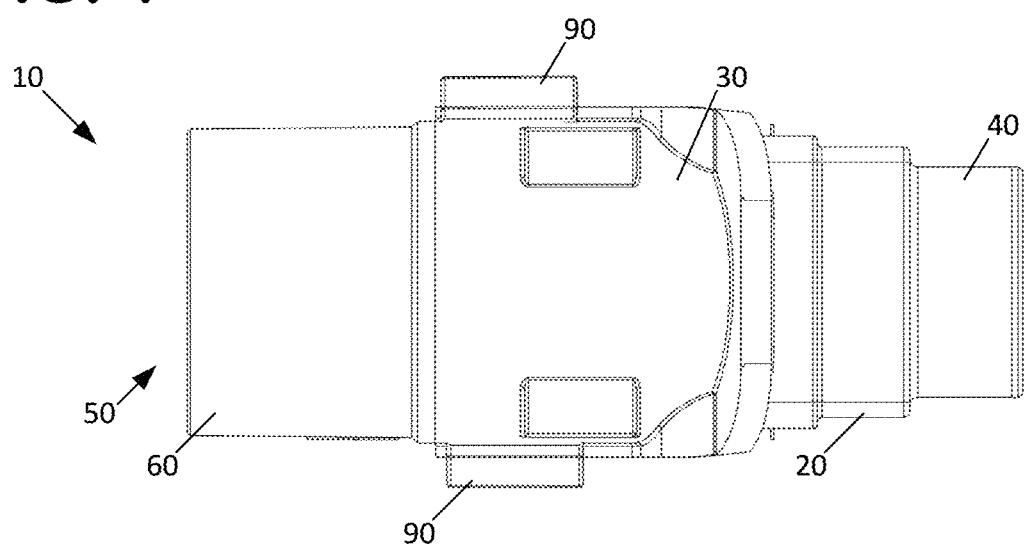
FIG. 4 is a top view of the air cleaner assembly shown in FIG. 1.

In one aspect, the access cover 30 is provided with a pair of pocket structures 34 formed within the housing sidewall 32. The pocket structures 34 define filter engagement surfaces 34a. As most easily seen at FIG. 3A, the pocket structures 34 receive a portion of the filter cartridge 100 such that the filter engagement surfaces 34 engage with corresponding engagement surfaces 128a located on the filter cartridge 100. When the access cover 30 is installed onto housing 20 and the connectors 90 are moved from an unlatched position to a latched position, the clamping force F1 exerted by the connectors 90 causes the access cover filter engagement surfaces 34 to exert a corresponding force onto the filter cartridge 100 in the direction D1. As the housing sealing surface 21 and the filter cartridge seal 130 are disposed at an oblique angle A1 to the direction D1, a component of the force F1 generated onto the filter cartridge 100 by the access cover 30 and connectors 90 urges the filter cartridge seal 130 against the housing sealing surface 21 such that a seal is formed. Thus, the clamping force F1 can be characterized as being disposed at an oblique angle to the sealing surface 21, to a plane along which the filter cartridge seal 130 is disposed, and to a plane defining the seal formed therebetween. In one characterization, the seal can be referred to as an oblique pinch seal since the component pinching force is disposed at an oblique angle (i.e. angle A1) to the flow direction and media flow faces and since the seal is pinched between the housing sealing surface 21 and the below described seal support flange 124. As indicated above, the access cover 30 can be integrally formed with the filter cartridge 100 such that the closing force exerted by the connectors 90 act directly onto the filter cartridge 100 to create the sealing force.

Filter Cartridge 100

Referring now to FIGS. 5, 6 and 9-15, an exemplary embodiment of filter cartridge 100 of air cleaner assembly 10 is illustrated. The filter cartridge 100 can be considered the main or primary filter cartridge, and is used to selectively separate a desired amount of particulate or containment material. Cartridge 100 is generally a service part or removable component, such that it is periodically removable and replaceable as desired or necessary during the lifetime of the air cleaner 10. In particular, when the cartridge 100 becomes occluded or otherwise needs to be replaced, the access cover 30 is unlocked from the housing 20, and the occluded filter 100 is removed by pulling the access cover in a direction opposite direction D1 away from the housing 20. Although not shown, a handle can be provided on one or both of the access cover 30 and filter cartridge 100. After such removal, another filter cartridge 100 can be placed in the housing 20 by inserting the filter cartridge 100 in an insertion direction, which is the same as direction D1. In one aspect, the insertion and removal directions of the cartridge 100 are orthogonal to the longitudinal axes of the filter cartridge 100 and housing 20.

The filter cartridge 100 extends between a first end 102 and a second end 104. In one aspect, the first end 102 can be characterized as the upstream end of the filter cartridge 100 while the second end 104 can be characterized as the downstream end of the filter cartridge 100. The filter cartridge 100 generally includes a media pack 110, a shell 120, and a seal member 130, each of which is described in further detail below.

In the example shown, the media pack 110 has inlet flow face 112 for receiving unfiltered air or pre-cleaned air from the precleaner (if provided) and an outlet flow face 114 for delivering filtered air. In the example shown, the media pack has an obround cross-sectional shape. However, other shapes are possible, such as round, oval, and rectangular cross-sectional shapes. In one aspect, the media pack defines an outer perimeter 116 extending between the inlet and outlet flow faces 112, 114. In the example shown, the media pack is formed from a coiled media construction, for example a media construction having a fluted (typically corrugated) media sheet and a facing media sheet that together define parallel flutes to form a fluted or z-filter media construction. Suitable media constructions for the media pack 110 are discussed in more detail in the Media Types and Configurations section.

In one aspect, the shell 120 of the filter cartridge 100 is formed from a polymeric material, such as ABS plastic. The shell 120 defines a perimeter wall 122 that surrounds the outer perimeter 116 of the media pack 110. The shell 120 may be secured to the media pack 110 by an adhesive. The perimeter wall 122 may surround the entirety of the media pack outer perimeter 116, or as shown, surround a portion of the media pack outer perimeter 116. In the particular embodiment presented, the perimeter wall 122 surrounds the media pack outer perimeter 116 upstream of the seal member 130, thereby leaving the media pack outer perimeter 116 exposed on the downstream side of the seal member 130.

In one aspect, the perimeter wall 122 terminates at a seal support flange 124 extending orthogonally from the perimeter wall 122. The seal support flange 124 provides a support surface for the seal member 130. The seal support flange 124 and the supported seal member 130 are disposed at the angle A1, thereby orienting the seal member 130 in a parallel relationship with the first sealing surface 21 on the housing. All three of the sealing surface 21, the seal support flange 124, and the seal member 130 are shown as being provided at the angle A1 at FIG. 3. The seal support flange 124 translates the closing force F1, provided by the access cover 30 and connectors 90 that is exerted onto the shell 120, onto the seal member 130. Thus, the seal member 130 is compressed between the parallel seal support flange 124 and the first sealing surface 21 on the housing 20. The opposite end of the shell terminates at a flange section 126 that extends beyond the inlet face 112 of the media pack 110. Although not shown, the flange section 126 can include a grid structure spanning across the media pack inlet face 112 to provide additional support to the media pack 110.

As presented, the shell 120 additionally includes engagement structures 128 defining engagement surfaces 128a. As previously described, and as most easily seen at FIG. 3A, the engagement structures 128 are received into the access cover pocket structures 34 such that the shell engagement surfaces 128a are brought into contact with the pocket structure engagement surfaces 34a. This construction allows the forces F1 exerted on the access cover 30 by the connectors 90 to be translated onto the filter cartridge 100 such that a component sealing force is exerted on the seal member 130. As stated above, the features of the access cover 30 can be entirely integrated into the shell 120 of the filter cartridge 100 such that the filter cartridge 100 simultaneously functions to enclose the housing 20 and to filter air passing through the air filter assembly 10. In such an arrangement, the connectors 90 would be directly attached to the shell and the provision of the engagement structures 128 on the shell 120 would not need to be provided.

The seal member 130 will generally be made of a relatively flexible material and may be referred to herein as a "flexible seal member," and can include a pinch, axial, or radial seal member. In one example, the seal member 130 is provided as an injection molded gasket. In one example, the seal member 130 is formed from polyurethane. In one example, the seal member 130 is provided with a non-planer outer profile, for example a "W" shape cross-sectional profile. In one example, the seal member 130 is separately formed and later adhered to the seal support flange 124, for example by an adhesive. In one example, the seal member 130 is molded onto the seal support flange 124.

As mentioned above, the seal member 130 is disposed at the angle A1 by virtue of being mounted to the seal support flange 124 on the shell 120. In some constructions, the seal member 130 could also be formed on the shell 120 at the angle A1 without the use of a seal support flange 124.

As the seal member 130 is disposed in a parallel relationship with the housing first sealing surface 21, the seal member 130 is disposed at a non-parallel or oblique angle to the inlet and outlet flow faces 112, 114 of the media pack 110 and is at a non-orthogonal or oblique angle to the direction D1 of the clamping or closing force F1 caused by the connectors 90. As is the case with the first sealing surface 21, the sealing member 130 angle A1 with respect to the inlet and outlet faces 112, 114 and to the closing force direction D1 can be between 5 and 45 degrees. In one example, the angle A1 of the sealing member 130 is between 5 and 20 degrees. In one example, the angle A1 of the sealing member 130 is between 5 and 15 degrees. In one example, the angle A1 of the sealing member is about 10 degrees. In one example, the angle A1 of the sealing member is about 18 degrees.

Figure 11:
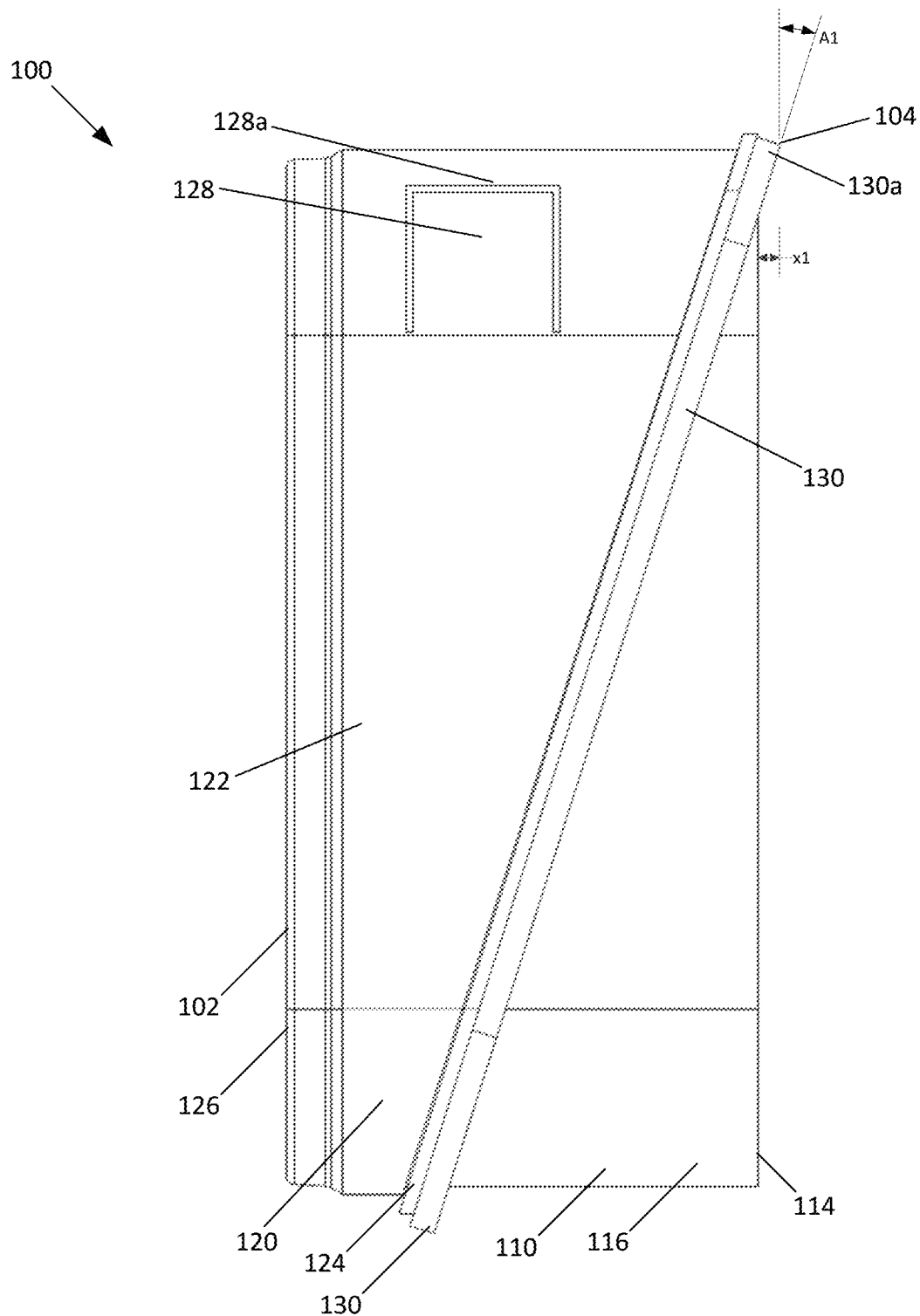
FIG. 11 is a side view of the filter cartridge shown in FIG. 9.
Figure 12:
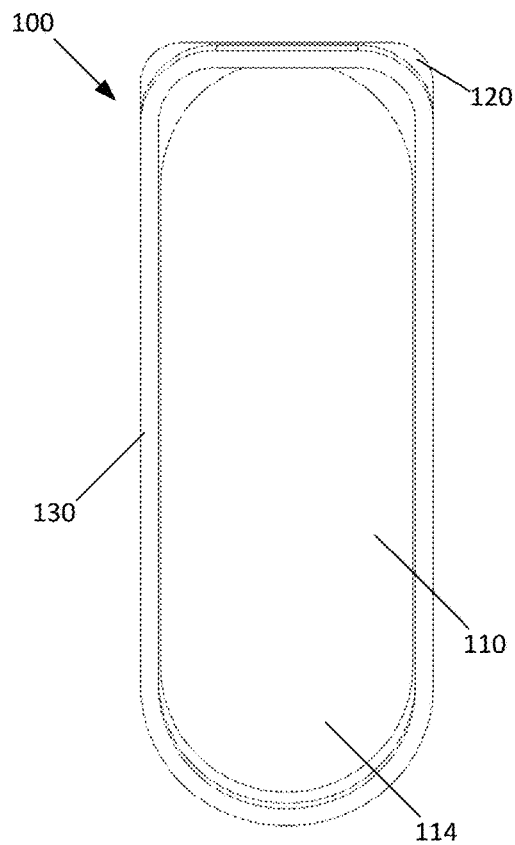
FIG. 12 is a front view of the filter cartridge shown in FIG. 9.
Figure 13:
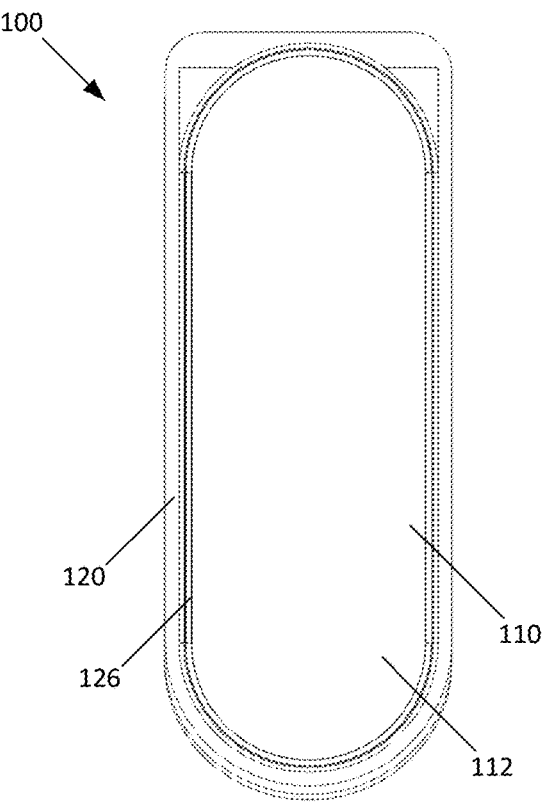
FIG. 13 is a rear view of the filter cartridge shown in FIG. 9.
Figure 14:
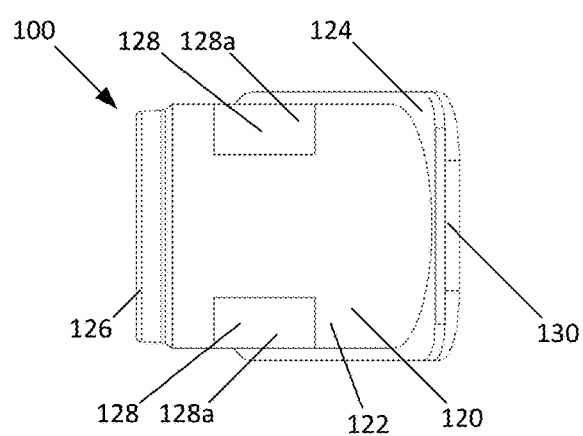
FIG. 14 is a top view of the filter cartridge shown in FIG. 9.
Figure 15:
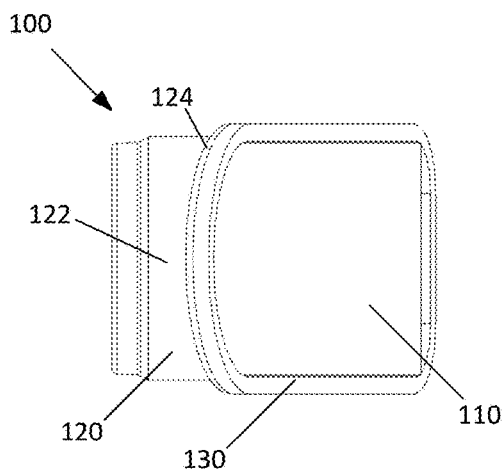
FIG. 15 is a bottom view of the filter cartridge shown in FIG. 9.
Figure 16:
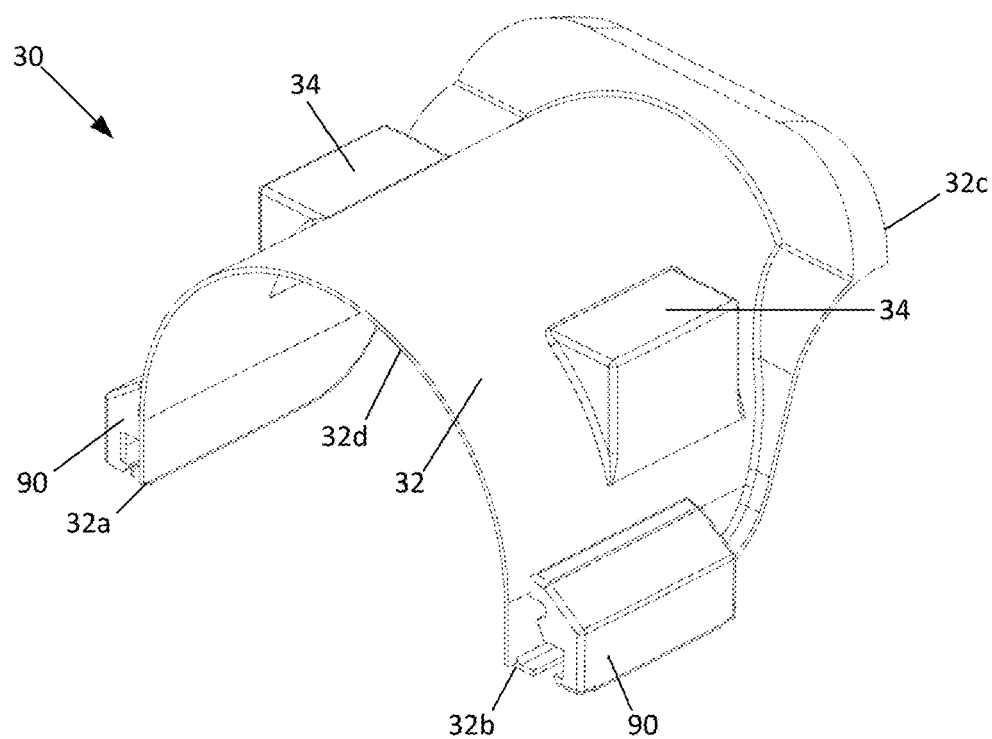
FIG. 16 is a top rear perspective view of the access cover of the air cleaner assembly shown in FIG. 1.
Figure 17:
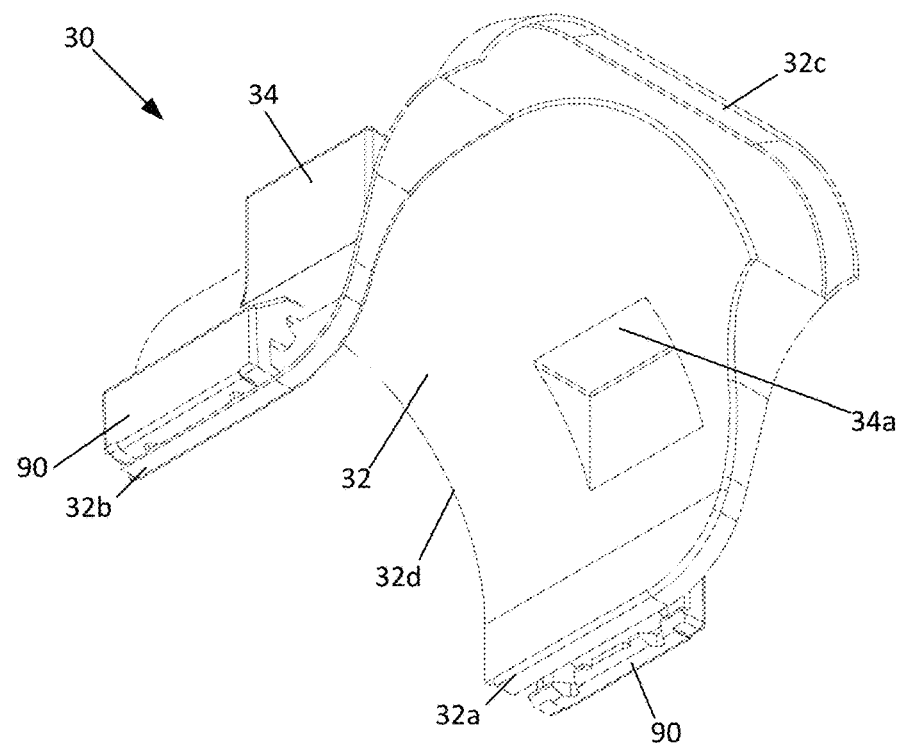
FIG. 17 is a bottom front perspective view of the access cover shown in FIG. 16.
Figure 18:
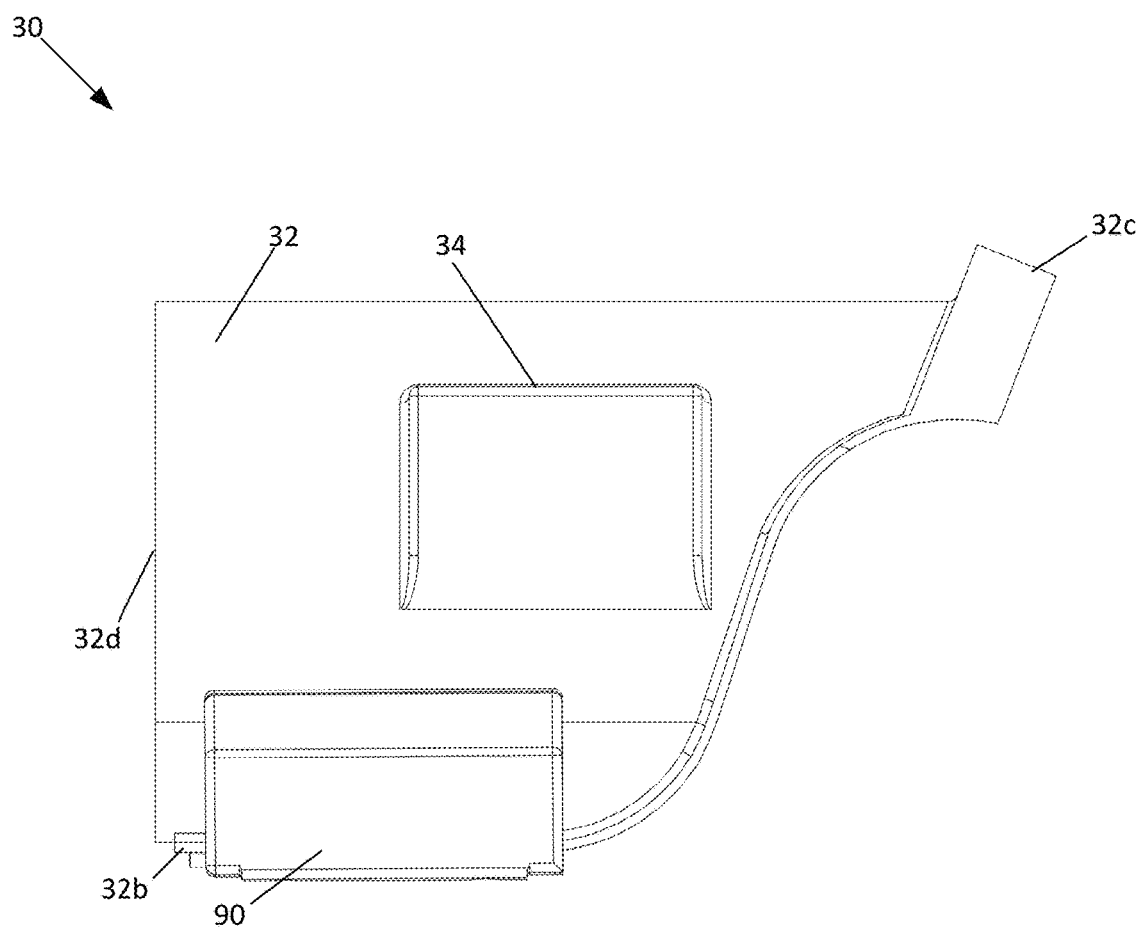
FIG. 18 is a side view of the access cover shown in FIG. 16.
Figure 19:
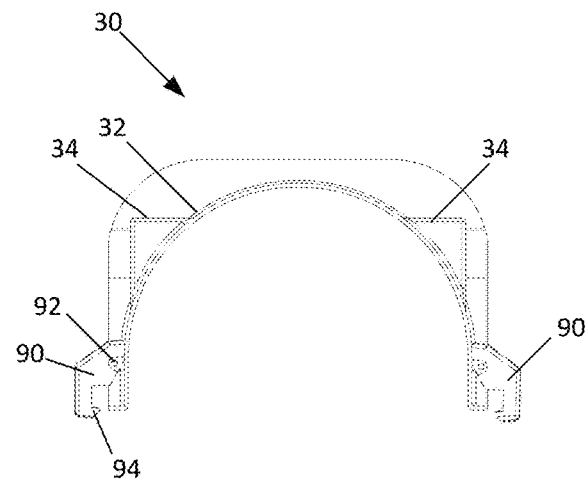
FIG. 19 is a rear view of the access cover shown in FIG. 16.
Figure 20:
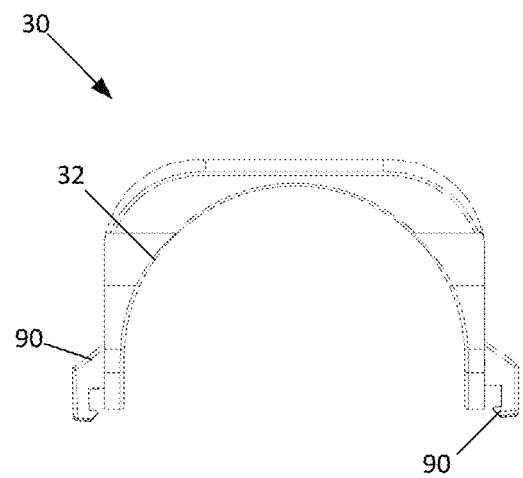
FIG. 20 is a front view of the access cover shown in FIG. 16.
Figure 21:
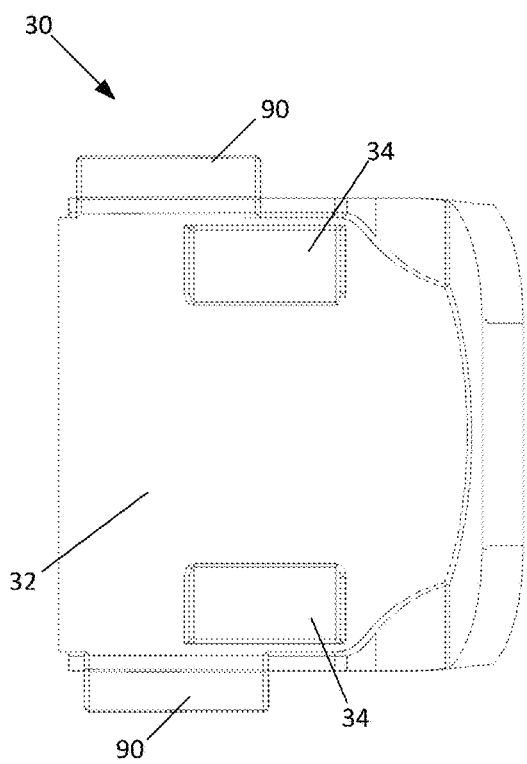
FIG. 21 is a top view of the access cover shown in FIG. 16.
Figure 22:
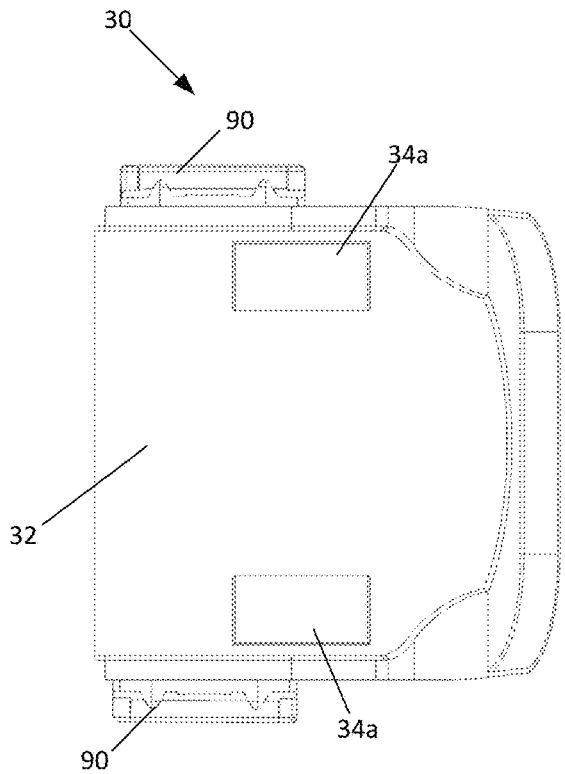
FIG. 22 is a bottom view of the access cover shown in FIG. 16.

In one aspect, the uppermost portion or segment 21a of the first sealing surface 21 on the housing 20 is located axially beyond the media pack outlet flow face 114. This configuration allows the filter cartridge 100 to be inserted into (and removed from) the interior region 20a of the housing 20 while still providing a continuous, closed sealing surface 21 on the housing 20. To ensure that the filter cartridge 100 can form a seal with the sealing surface 21, the sealing member 130 is oriented with respect to the media pack 110 such that the uppermost portion or segment 130a of the sealing member 130 extends beyond the outlet face 114 of the media pack 110. This configuration allows the seal member 130 to be the furthest extending element of the filter cartridge 100 on one side of the filter cartridge 100. In the example, shown, the seal member 130 is the furthest distal element of the filter cartridge 100 and defines the downstream end 104 of the filter cartridge 100 proximate the outlet flow face. In such a configuration, a first portion of the seal member 130 is located between the media pack inlet and outlet flow faces 112, 114 while a second portion is located beyond one of the inlet and outlet faces 112, 114. In one example, as indicated at FIG. 11, the second portion of the seal member 130 extends a distance x1 beyond the media pack outlet flow face 114. In some examples, the distance x1 is less than a thickness of the seal member 130 while in others the distance x1 is equal to or greater than a thickness of the seal member 130. In an alternative arrangement, the housing sealing surface 21, the shell seal support 124, and the sealing member 130 are located proximate the upstream end 102 of the filter cartridge 100 at a reverse angle such that a mirrored configuration to that shown in the drawings is provided.

Although the angled portions of the seal member 130 and seal support surface 124 that are disposed at the angle A1 are shown as being provided along the long sides (i.e. along the major axis of the filter cartridge 100) of the filter cartridge 100, the angled portions could instead be located along the short sides (i.e. the minor axis of the filter cartridge 100) of the filter cartridge 100 if the housing opening 26 is also on one of the long sides of the housing 20. In such an arrangement, the portions of the seal member 130 extending along the long sides of the filter cartridge 100 would be disposed in a parallel relationship with the outlet flow face 114 in the same way as shown in the drawings for the portions of the seal member 130 extending along the short sides of the filter cartridge 100. In one example, all segments of the seal member 130 are provided at an oblique angle to the outlet flow face 140. In the above-described alternative configurations, the housing 20 and sealing surface 21 can be correspondingly modified to accept the filter cartridge 100. As noted in another section, the media pack 110 and filter cartridge 100 can have shapes other than the obround shape shown in the drawings that do not necessarily have a minor or major axis. For example, the media pack 110 could be cylindrical. In such cases, the orientation of the seal member 130 can still be provided at the oblique angle A1.

Filter Cartridge 150

Figure 5:
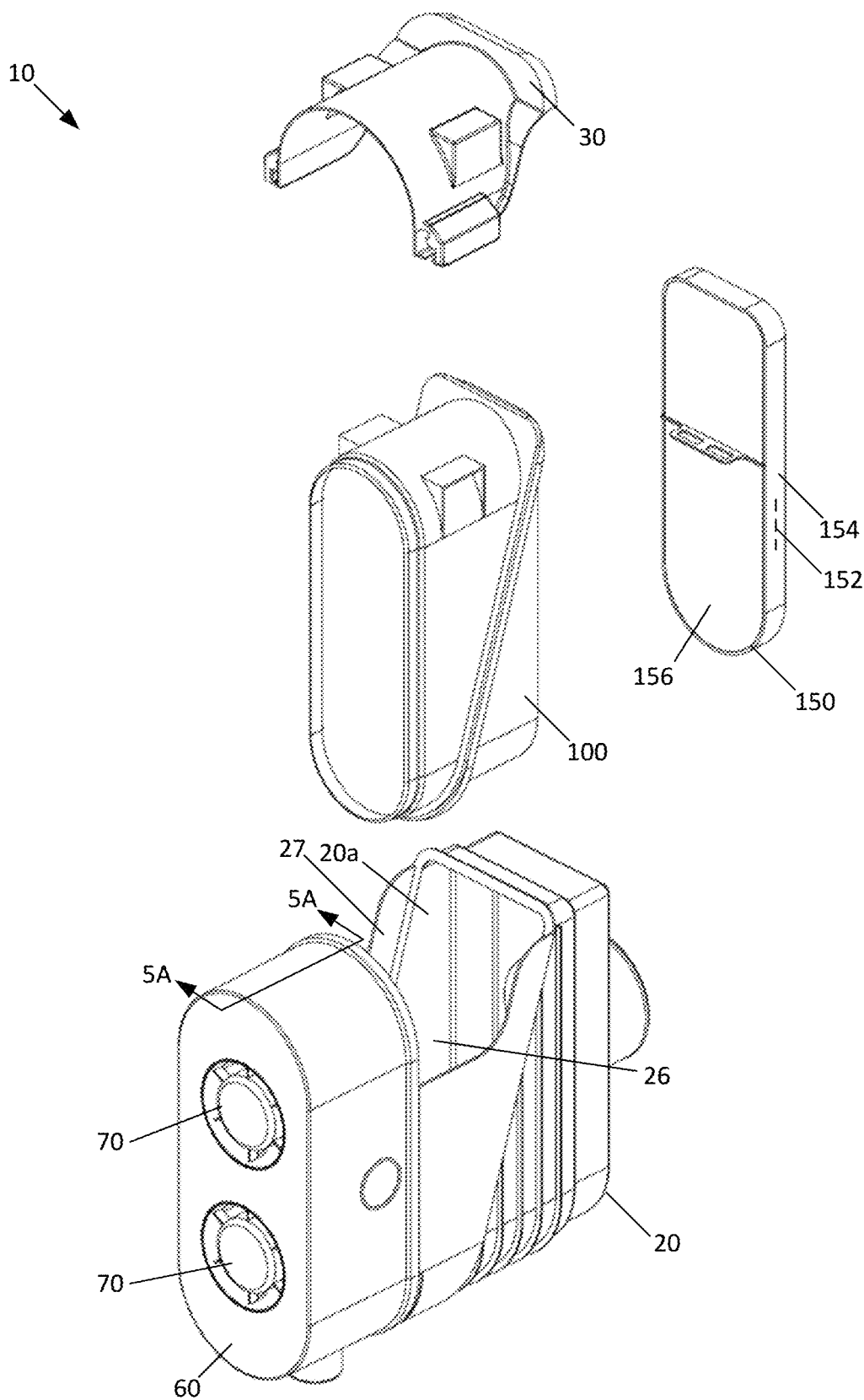
FIG. 5 is an exploded rear perspective view of the air cleaner assembly shown in FIG. 1.
Figure 5A:
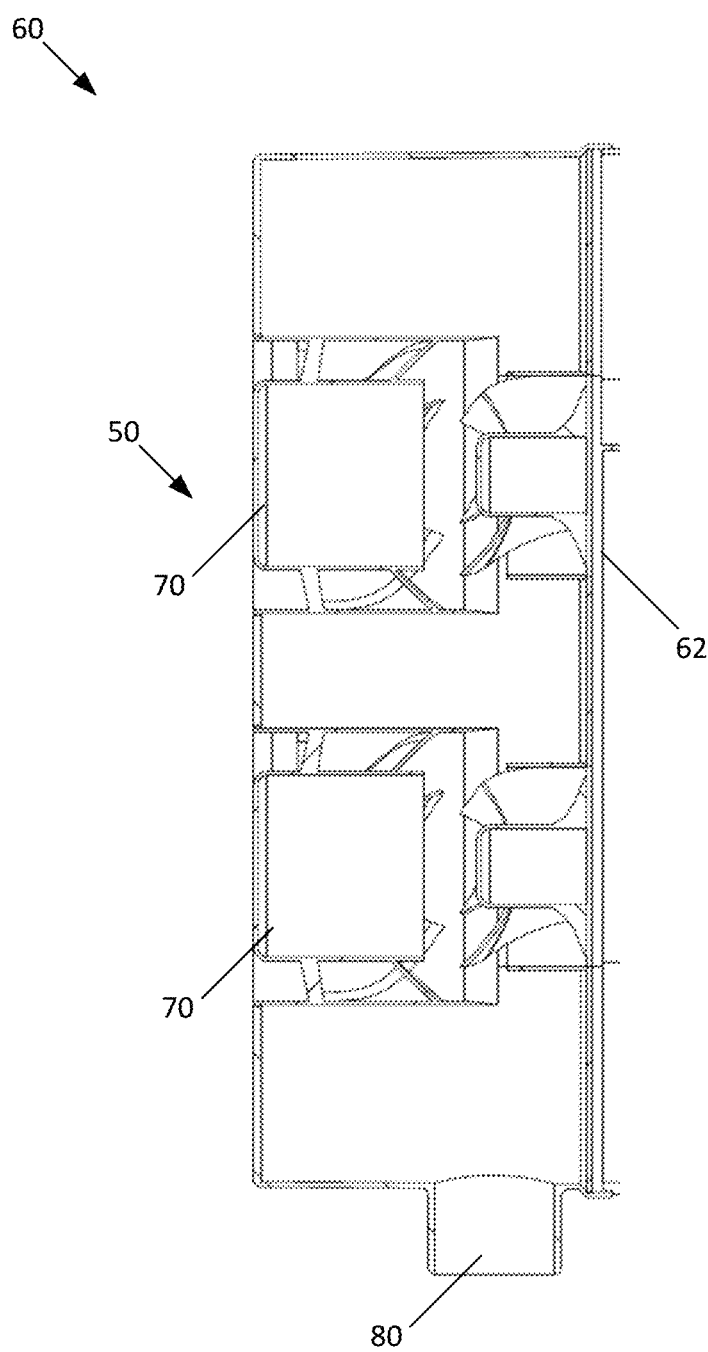
FIG. 5A is a cross-sectional view of the precleaner of the air cleaner assembly shown in FIG. 1, taken along the line 5A-5A in FIG. 5.

Referring to FIGS. 5 and 6, the exemplary air cleaner assembly 10 includes an optional secondary or safety filter 150. The safety filter 150 is generally positionable between the main filter cartridge 100 and the outlet 40 of the housing 20. In a typical arrangement, the safety filter 150 is removably positioned within the air cleaner assembly 10 and would also typically be considered to be a service component that is removable and replaceable, as desired and/or necessary.

As shown, the exemplary embodiment of safety filter 150 includes an outer frame 152 that carries a seal member 154 and generally matches the size and shape of the inner area of the housing 20 adjacent to the outlet 40, preferably with no gaps. In this way, the safety filter 150 can be pressed into the housing 20 with a friction fit against the second sealing surface 22 of the housing 20 so that no air can reach the outlet 40 without first going through the safety filter 150. Accordingly, the seal member 154 can be characterized as being an outwardly directed radial seal. The safety filter 150 can also include filtration media 156, such as pleated media. Some suitable media constructions for the media pack 150 are discussed in more detail in the *Media Types and Configurations* section.

Media Types and Configurations

The particular material chosen for the media is a matter of choice for a selected application. When the filter assembly is an air cleaner, any of a variety of media materials used in air cleaners can be used with principles according to the present disclosure.

The media pack can comprise only media or the media can be provided with an inner and/or outer liner before installation in the cartridge. The media can be pleated, non-pleated, or wave media although additional alternatives are possible. The media can be provided in a variety of configurations including cylindrical and conical, and with a variety of inner and/or outer perimeter definitions, for example circular or oval.

The principles described herein can be applied in a variety of filter assemblies. Examples described in which the principles applied to (air) gas filter assemblies. Examples are described include air filters and crankcase ventilation filter assemblies. The principles can be applied to a variety of alternate gas filtration arrangements, in some instances even with liquid filter assemblies.

Principles according to the present disclosure relate to interactions between filter cartridges and air cleaner systems, in advantageous manners to achieve certain, selected, desired results discussed below. The filter cartridge would generally include a filter media therein, through which air and other gases pass, during a filtering operation. The media can be of a variety of types and configurations, and can be made from using a variety of materials. For example, pleated media arrangements can be used in cartridges according to the principles of the present disclosure, as discussed below.

The principles are particularly well adapted for use in situations in which the media is quite deep in extension between the inlet and outlet ends of the cartridge, but alternatives are possible. Also, the principles are often used in cartridges that relatively large cross-dimension sizes. With such arrangements, alternate media types to pleated media will often be desired.

In this section, examples of some media arrangements that are usable with the techniques described herein are provided. It will be understood, however, that a variety of alternate media types can be used. The choice of media type is generally one of preference for: availability; function in a given situation of application, ease of manufacturability, etc. and the choice is not necessarily specifically related to the overall function of selected ones of various filter cartridge/air cleaner interaction features characterized herein.

Fluted filter media (e.g., media having media ridges) can be used to provide fluid filter constructions in a variety of manners. One well known manner is characterized herein as a z-filter construction. The term "z-filter construction" as used herein, is meant to include (but not be limited to) a type of filter construction in which individual ones of corrugated, folded or otherwise formed filter flutes are used to define (typically in combination with facing media) sets of longitudinal, typically parallel, inlet and outlet filter flutes for fluid flow through the media. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428,128; Des. 396,098; Des. 398,046; and, Des. 437,401; each of these cited references being incorporated herein by reference.

One type of z-filter media utilizes two specific media components joined together, to form the media construction. The two components are: (1) a fluted (typically corrugated) media sheet or sheet section, and, (2) a facing media sheet or sheet section. The facing media sheet is typically non-corrugated, however it can be corrugated, for example perpendicularly to the flute direction as described in U.S.

provisional 60/543,804, filed Feb. 11, 2004, and published as PCT WO 05/077487 on Aug. 25, 2005, incorporated herein by reference.

The fluted media section and facing media section can comprise separate materials between one another. However, they can also be sections of the single media sheet folded to bring the facing media material into appropriate juxtaposition with the fluted media portion of the media.

The fluted (typically corrugated) media sheet and the facing media sheet or sheet section together, are typically used to define media having parallel flutes. In some instances, the fluted sheet and facing sheet are separate and then secured together and are then coiled, as a media strip, to form a z-filter media construction. Such arrangements are described, for example, in U.S. Pat. Nos. 6,235,195 and 6,179,890, each of which is incorporated herein by reference. In certain other arrangements, some non-coiled sections or strips of fluted (typically corrugated) media secured to facing media, are stacked with one another, to create a filter construction. An example of this is described in FIG. 11 of U.S. Pat. No. 5,820,646, incorporated herein by reference.

Herein, strips of material comprising fluted sheet (sheet of media with ridges) secured to corrugated sheet, which are then assembled into stacks to form media packs, are sometimes referred to as "single facer strips," "single faced strips," or as "single facer" or "single faced" media. The terms and variants thereof, are meant to refer to a fact that one face, i.e., a single face, of the fluted (typically corrugated) sheet is faced by the facing sheet, in each strip.

Typically, coiling of a strip of the fluted sheet/facing sheet (i.e., single facer) combination around itself, to create a coiled media pack, is conducted with the facing sheet directed outwardly. Some techniques for coiling are described in U.S. provisional application 60/467,521, filed May 2, 2003 and PCT Application US 04/07927, filed Mar. 17, 2004, now published as WO 04/082795, each of which is incorporated herein by reference. The resulting coiled arrangement generally has, as the outer surface of the media pack, a portion of the facing sheet, as a result.

The term "corrugated" used herein to refer to structure in media, is often used to refer to a flute structure resulting from passing the media between two corrugation rollers, i.e., into a nip or bite between two rollers, each of which has surface features appropriate to cause corrugations in the resulting media. The term "corrugation" is however, not meant to be limited to such flutes, unless it is stated that they result from flutes that are by techniques involving passage of media into a bite between corrugation rollers. The term "corrugated" is meant to apply even if the media is further modified or deformed after corrugation, for example by the folding techniques described in PCT WO 04/007054, and published Jan. 22, 2004, incorporated herein by reference.

Corrugated media is a specific form of fluted media. Fluted media is media which has individual flutes or ridges (for example formed by corrugating or folding) extending thereacross.

Serviceable filter element or filter cartridge configurations utilizing z-filter media are sometimes referred to as "straight through flow configurations" or by variants thereof. In general, in this context what is meant is that the serviceable filter elements or cartridges generally have an inlet flow end (or face) and an opposite exit flow end (or face), with flow entering and exiting the filter cartridge in generally the same straight through direction. The term "serviceable" in this context is meant to refer to a media containing filter cartridge that is periodically removed and replaced from a corresponding fluid (e.g. air) cleaner. In some instances, each of the inlet flow end (or face) and outlet flow end (or face) will be generally flat or planar, with the two parallel to one another. However, variations from this, for example non-planar faces, are possible.

A straight through flow configuration (especially for a coiled or stacked media pack) is, for example, in contrast to serviceable filter cartridges such as cylindrical pleated filter cartridges of the type shown in U.S. Pat. No. 6,039,778, incorporated herein by reference, in which the flow generally makes a substantial turn as its passes into and out of the media. That is, in a U.S. Pat. No. 6,039,778 filter, the flow enters the cylindrical filter cartridge through a cylindrical side, and then turns to exit through an open end of the media (in forward-flow systems). In a typical reverse-flow system, the flow enters the serviceable cylindrical cartridge through an open end of the media and then turns to exit through a side of the cylindrical filter media. An example of such a reverse-flow system is shown in U.S. Pat. No. 5,613,992, incorporated by reference herein.

The term "z-filter media construction" and variants thereof as used herein, without more, is meant to include, but not necessarily be limited to, any or all of: a web of corrugated or otherwise fluted media (media having media ridges) secured to (facing) media, whether the sheets are separate or part of a single web, with appropriate sealing (closure) to allow for definition of inlet and outlet flutes; and/or a media pack constructed or formed from such media into a three dimensional network of inlet and outlet flutes; and/or, a filter cartridge or construction including such a media pack.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

Typically, in the corrugation process a deformation is caused to the media. After the tension is released the flute or corrugations will tend to partially spring back, recovering only a portion of the stretch and bending that has occurred. The facing media sheet is sometimes tacked to the fluted media sheet, to inhibit this spring back in the corrugated sheet.

The media of the corrugated (fluted) sheet facing sheet or both, can be provided with a fine fiber material on one or both sides thereof, for example in accord with U.S. Pat. No. 6,673,136, incorporated herein by reference. In some instances, when such fine fiber material is used, it may be desirable to provide the fine fiber on the upstream side of the material.

An issue with respect to z-filter constructions relates to closing of the individual flute ends. Although alternatives are possible, typically a sealant or adhesive is provided, to accomplish the closure. As is apparent from the discussion above, in typical z-filter media especially that which uses straight flutes as opposed to tapered flutes and sealant for flute seals, large sealant surface areas (and volume) at both the upstream end and the downstream end are needed. High quality seals at these locations are important to proper operation of the media structure that results. The high sealant volume and area, creates issues with respect to this.

Techniques described herein are particularly well adapted for use in media packs that result from a step of coiling a single sheet comprising a corrugated sheet/facing sheet combination, i.e., a "single facer" strip. However, they can also be made into stacked arrangements.

Coiled media or media pack arrangements can be provided with a variety of peripheral perimeter definitions. In this context the term "peripheral, perimeter definition" and variants thereof, is meant to refer to the outside perimeter shape defined, looking at either the inlet end or the outlet end of the media or media pack. Typical shapes are circular as described in PCT WO 04/007054. Other useable shapes are obround, some examples of obround being oval shape. In general oval shapes have opposite curved ends attached by a pair of opposite sides. In some oval shapes, the opposite sides are also curved. In other oval shapes, sometimes called racetrack shapes, the opposite sides are generally straight. Racetrack shapes are described for example in PCT WO 04/007054, and PCT application US 04/07927, published as WO 04/082795, each of which is incorporated herein by reference.

Another way of describing the peripheral or perimeter shape is by defining the perimeter resulting from taking a cross-section through the media pack in a direction orthogonal to the winding access of the coil.

Opposite flow ends or flow faces of the media or media pack can be provided with a variety of different definitions. In many arrangements, the ends or end faces are generally flat (planer) and perpendicular to one another. In other arrangements, one or both of the end faces include tapered, for example, stepped, portions which can either be defined to project axially outwardly from an axial end of the side wall of the media pack; or, to project axially inwardly from an end of the side wall of the media pack.

The flute seals (for example from the single facer bead, winding bead or stacking bead) can be formed from a variety of materials. In various ones of the cited and incorporated references, hot melt or polyurethane seals are described as possible for various applications.

Figure 23:
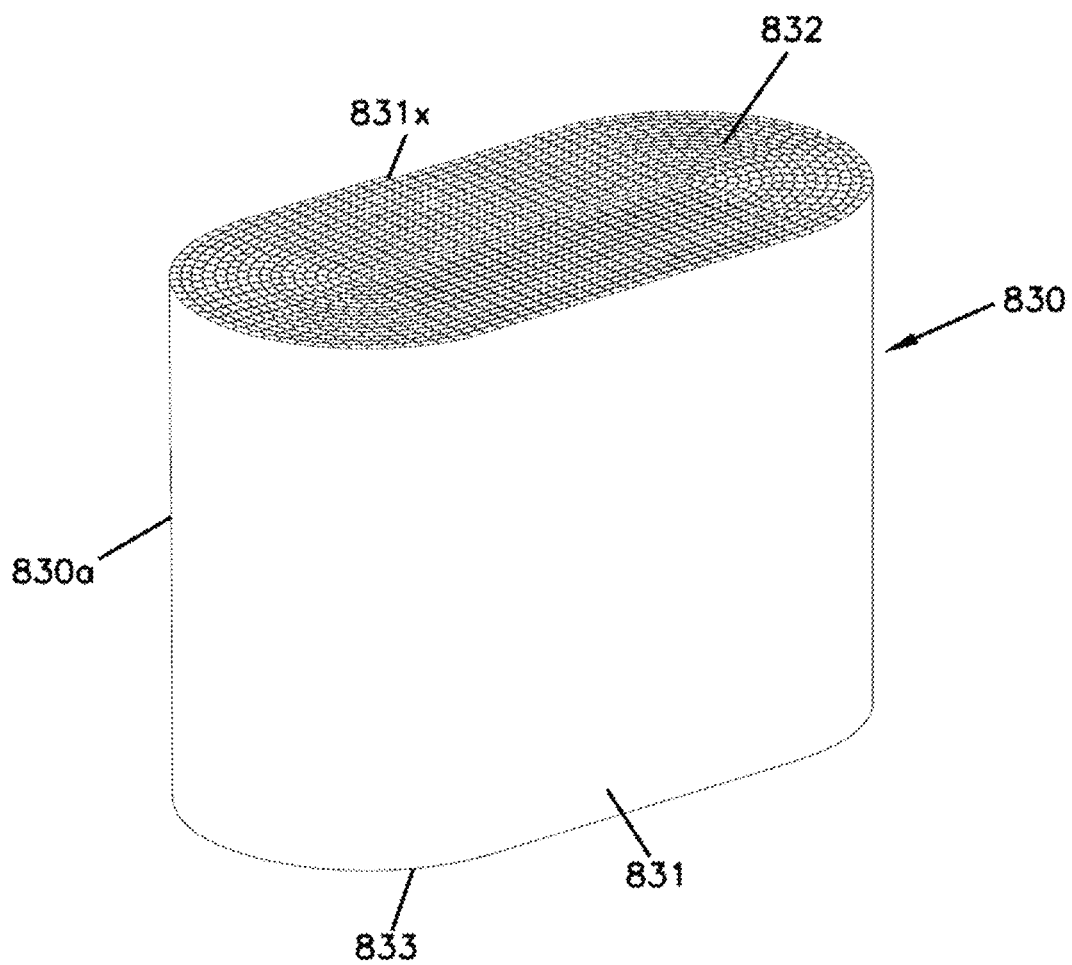
FIG. 23 is a perspective view of an alternative media pack that can be used in the air cleaner assembly of the present disclosure.

In FIG. 23, a coiled media pack (or coiled media) 830 constructed by coiling a single strip of single faced media is depicted, generally. The particular coiled media pack depicted is an oval media pack 830a, specifically a racetrack shaped media pack 831. The tail end of the media, at the outside of the media pack 830 is shown at 831x. It will be typical to terminate that tail end along straight section of the media pack 830 for convenience and sealing. Typically, a hot melt seal bead or seal bead is positioned along that tail end to ensure sealing. In the media pack 830, the opposite flow (end) faces are designated at 832, 833. One would be an inlet flow face, the other an outlet flow face.

Figure 24:
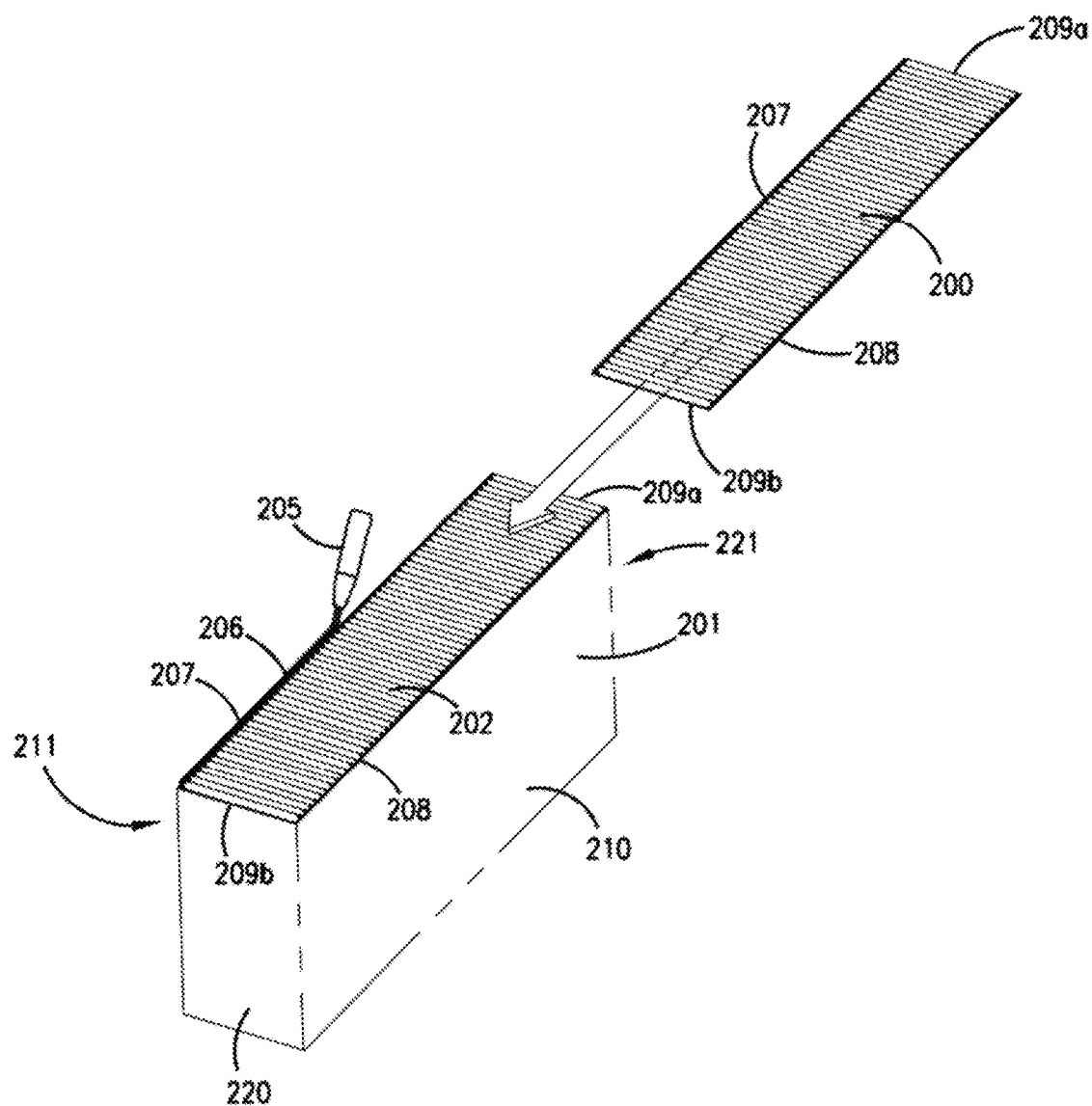
FIG. 24 is a perspective view of an alternative media pack that can be used in the air cleaner assembly of the present disclosure.

In FIG. 24, there is (schematically) shown a step of forming stacked z-filter media (or media pack) from strips of z-filter media, each strip being a fluted sheet secured to a facing sheet. Referring to FIG. 23, single facer strip 200 is being shown added to a stack 201 of strips 202 analogous to strip 200. Strip 200 can be cut from either of strips 76, 77. At 205, FIG. 23, application of a stacking bead 206 is shown, between each layer corresponding to a strip 200, 202 at an opposite edge from the single facer bead or seal. (Stacking can also be done with each layer being added to the bottom of the stack, as opposed to the top.)

Referring to FIG. 24, each strip 200, 202 has front and rear edges 207, 208 and opposite side edges 209a, 209b. Inlet and outlet flutes of the corrugated sheet/facing sheet combination comprising each strip 200, 202 generally extend between the front and rear edges 207, 208, and parallel to side edges 209a, 209b.

Still referring to FIG. 24, in the media or media pack 201 being formed, opposite flow faces are indicated at 210, 211. The selection of which one of faces 210, 211 is the inlet end face and which is the outlet end face, during filtering, is a matter of choice. In some instances the stacking bead 206 is positioned adjacent the upstream or inlet face 211; in others the opposite is true. The flow faces 210, 211, extend between opposite side faces 220, 221.

The stacked media configuration or pack 201 is sometimes referred to herein as a "blocked" stacked media pack. The term "blocked" in this context, is an indication that the arrangement is formed to a rectangular block in which all faces are 90° relative to all adjoining wall faces. In another example, in some instances the stack can be created with each strip 200 being slightly offset from alignment with an adjacent strip, to create a parallelogram or slanted block shape, with the inlet face and outlet face parallel to one another, but not perpendicular to upper and bottom surfaces.

In some instances, the media or media pack will be referenced as having a parallelogram shape in any cross-section, meaning that any two opposite side faces extend generally parallel to one another.

It is noted that a blocked, stacked arrangement corresponding to FIG. 24 is described in the prior art of U.S. Pat. No. 5,820,646, incorporated herein by reference. It is also noted that stacked arrangements are described in U.S. Pat. Nos. 5,772,883; 5,792,247; U.S. Patent Publication No. 2004/0187689. Each of these latter references is incorporated herein by reference. It is noted that a stacked arrangement shown in U.S. Patent Publication No. 2005/0130508 is a slanted stacked arrangement.

It is also noted that, in some instances, more than one stack can be incorporated into a single media pack. Also, in some instances, the stack can be generated with one or more flow faces that have a recess therein, for example, as shown in U.S. Pat. No. 7,625,419 incorporated herein by reference.

Figure 25:
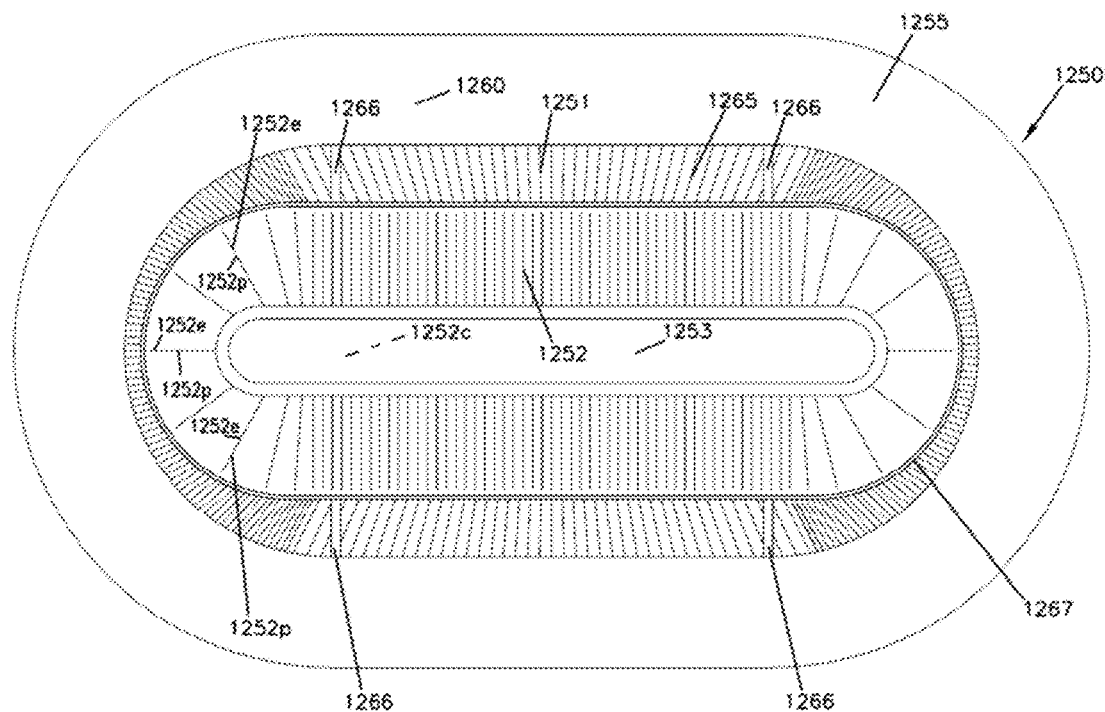
FIG. 25 is a top view of an alternative media pack that can be used in the air cleaner assembly of the present disclosure.

Alternate types of media arrangements or packs that involve flutes between opposite ends extending between can be used with selected principles according to the present disclosure. An example of such alternate media arrangement or pack is depicted in FIGS. 25-25B. The media of FIGS. 25-25B is analogous to one depicted and described in DE 20 2008 017 059 U1; and as can sometimes found in arrangements available under the mark "IQORON" from Mann & Hummel.

Referring to FIG. 25, the media or media pack is indicated generally at 1250. The media or media pack 1250 comprises a first outer pleated (ridged) media loop 1251 and a second, inner, pleated (ridged) media loop 1252, each with pleat tips (or ridges) extending between opposite flow ends. The view of FIG. 25 is toward a media pack (flow) end 1255. The end 1255 depicted, can be an inlet (flow) end or an outlet (flow) end, depending on selected flow direction. For many arrangements using principles characterized having the media pack 1250 would be configured in a filter cartridge such that end 1255 is an inlet flow end.

Still referring to FIG. 25, the outer pleated (ridged) media loop 1251 is configured in an oval shape, though alternatives are possible. At 1260, a pleat end closure, for example molded in place, is depicted closing ends of the pleats or ridges 1251 at media pack end 1255.

Pleats, or ridges 1252 (and the related pleat tips) are positioned surrounded by and spaced from loop 1251, and thus pleated media loop 1252 is also depicted in a somewhat oval configuration. In this instance, ends 1252e of individual pleats or ridges 1252p in a loop 1252 are sealed closed. Also, loop 1252 surrounds the center 1252c that is closed by a center strip 1253 of material, typically molded-in-place.

During filtering, when end 1255 is an inlet flow end, air enters gap 1265 between the two loops of media 1251, 1252. The air then flows either through loop 1251 or loop 1252, as it moves through the media pack 1250, with filtering.

In the example depicted, loop 1251 is configured slanting inwardly toward loop 1252, in extension away from end 1255. Also spacers 1266 are shown supporting a centering ring 1267 that surrounds an end of the loop 1252, for structural integrity.

Figure 25A:
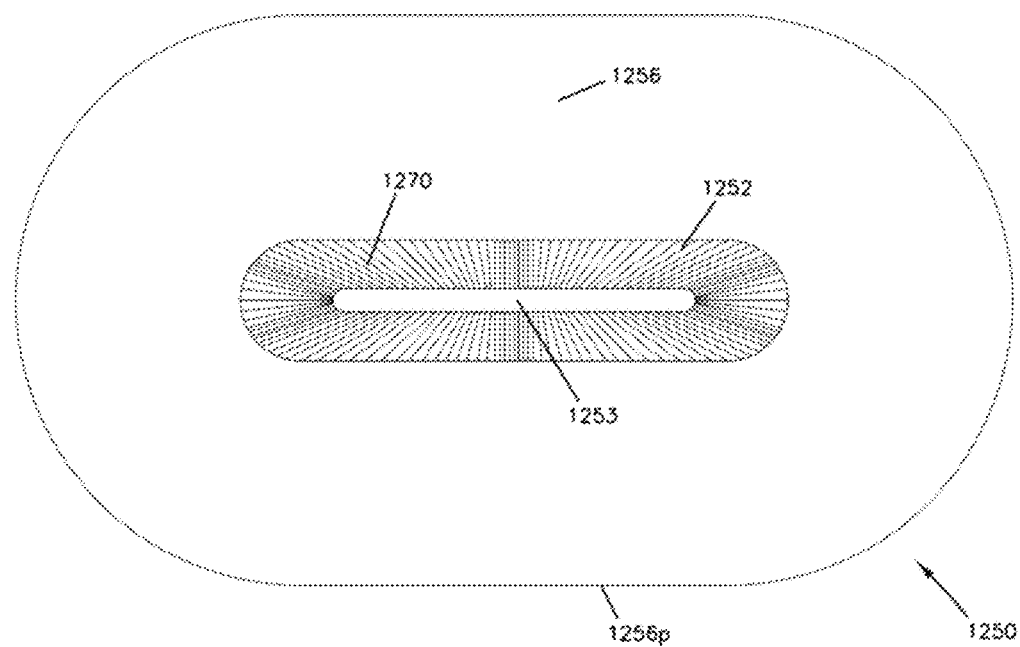
FIG. 25A is a bottom view of the media pack of FIG. 25.
Figure 25B:
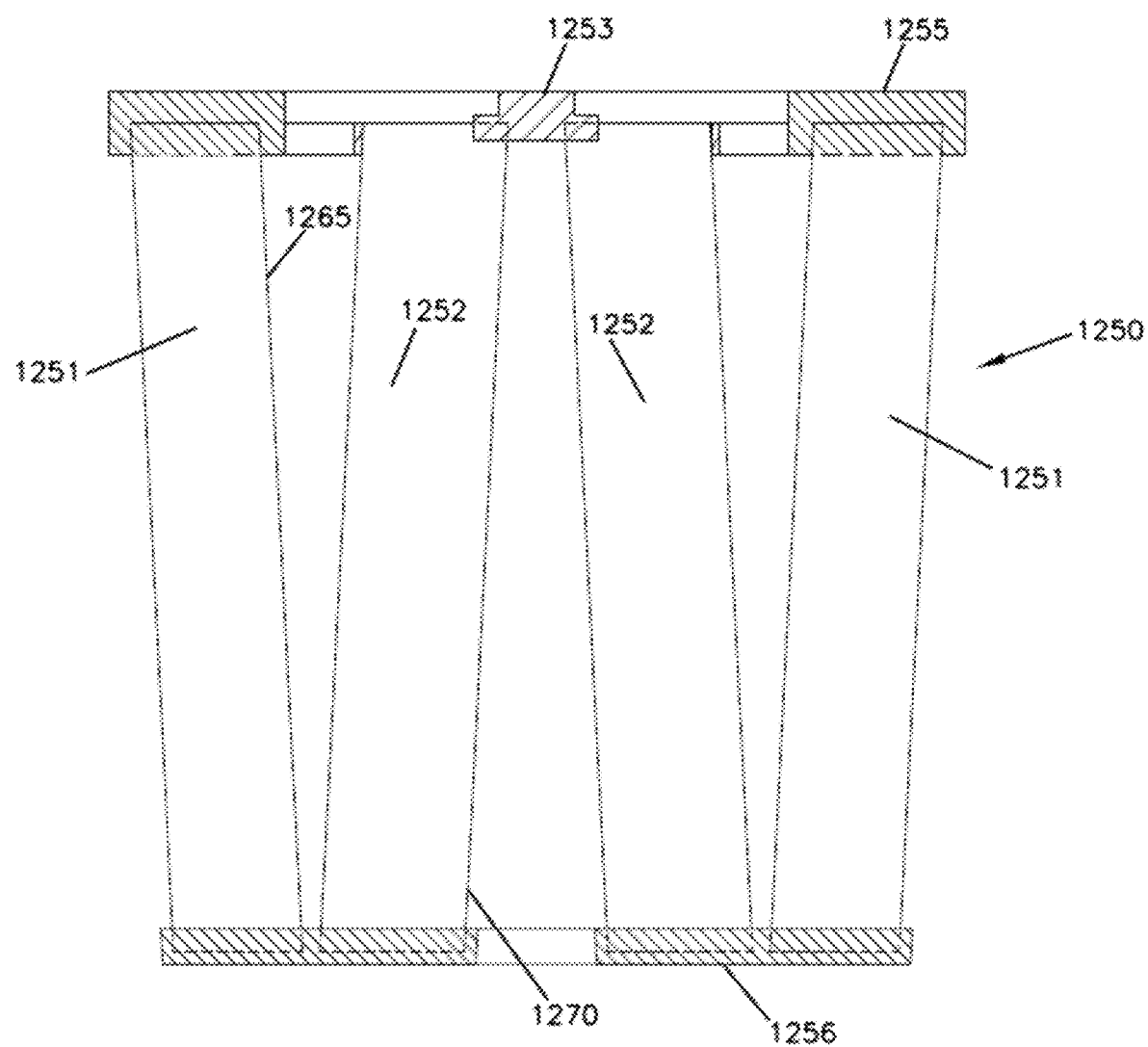
FIG. 25B is a side view of the media pack of FIG. 25.

In FIG. 25A, an end 1256 of the cartridge 1250, opposite end 1255 is viewable. Here, an interior of loop 1252 can be seen, surrounding an open gas flow region 1270. When air is directed through cartridge 1250 in a general direction toward end 1256 and away from end 1255, the portion of the air that passes through loop 1252 will enter central region 1270 and exit therefrom at end 1256. Of course air that has entered media loop 1251 during filtering would generally pass around (over) an outer perimeter 1256p of end 1256.

In FIG. 25B a schematic cross sectional view of cartridge 1250 is provided. Selected identified and described features are indicated by like reference numerals It will be understood from a review of FIGS. 25-25B, the above description, that the cartridge 1250 described, is generally a cartridge which has media tips extending in a longitudinal direction between opposite flow ends 1255, 1256.

In the arrangement of FIGS. 25-25B, the media pack 1250 is depicted with an oval, in particular racetrack, shaped perimeter. It is depicted in this manner, since the air filter cartridges in many examples below also have an oval or racetrack shaped configuration. However, the principles can be embodied in a variety of alternate peripheral shapes.

Herein, in FIGS. 26-31, some schematic, fragmentary, cross-sectional views are provided of still further alternate variations of media types that can be used in selected applications of the principles characterized herein. Certain examples are described in U.S. Ser. No. 62/077,749, filed Nov. 10, 2014 and owned by the Assignee of the present disclosure, Donaldson Company, Inc. The disclosure of U.S. Ser. No. 62/077,749 is incorporated herein by reference. In general, the arrangement of FIGS. 9-15 represents a media type that can be stacked or coiled into an arrangement that has opposite inlet and outlet flow ends (or faces), with straight through flow.

Figure 26:
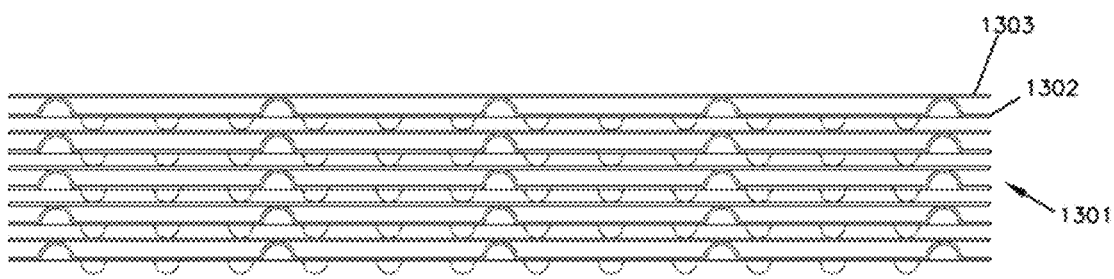
FIG. 26 is an end view of an alternative media pack that can be used in the air cleaner assembly of the present disclosure.

In FIG. 26, an example media arrangement 1301 from U.S. Ser. No. 62/077,749 is depicted, in which an embossed sheet 1302 is secured to a non-embossed sheet 1303, then stacked and coiled into a media pack, with seals along opposite edges of the type previously described for FIG. 1 herein.

Figure 27:
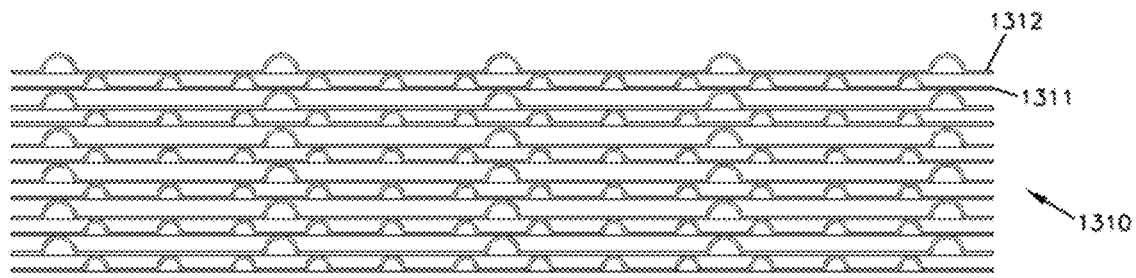
FIG. 27 is a perspective view of an alternative media pack that can be used in the air cleaner assembly of the present disclosure.

In FIG. 27, an alternate example media pack 1310 from U.S. Ser. No. 62/077,749 is depicted, in which a first embossed sheet 1311 is secured to a second embossed sheet 1312 and then formed into a stacked or coiled media pack arrangement, having edge seals.

Edge seals can be conducted in either the upstream end or the downstream end, or in some instances both. Especially when the media is likely to encounter chemical material during filtering, it may be desirable to avoid a typical adhesive or sealant.

Figure 28A:
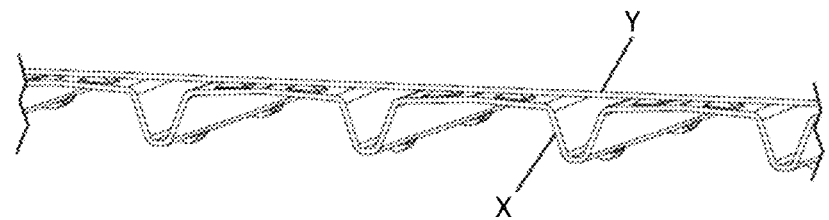
FIG. 28A is a perspective view of an alternative media pack that can be used in the air cleaner assembly of the present disclosure.

In FIG. 28A, a cross-section is depicted in which the fluted sheet X has various embossments on it for engagement with the facing sheet Y. Again these can be separate, or sections of the same media sheet.

Figure 28B:
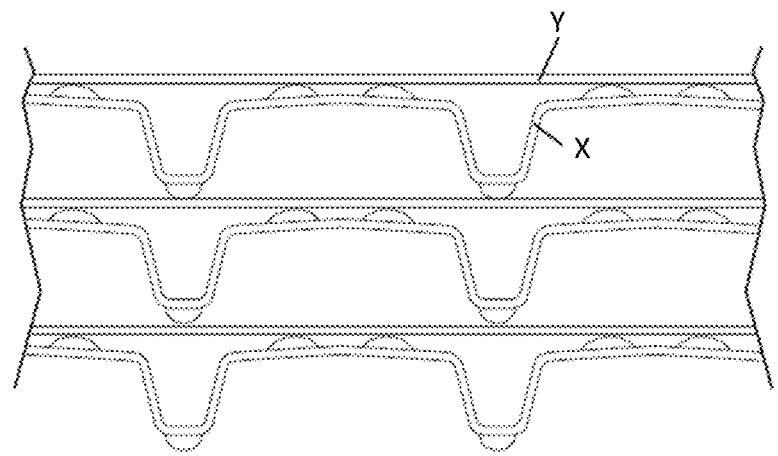
FIG. 28B is an end view of a portion of the media pack of FIG. 28A.

In FIG. 28B, a schematic depiction of such an arrangement between the fluted sheet X and facing sheet Y is also shown.

Figure 28C:
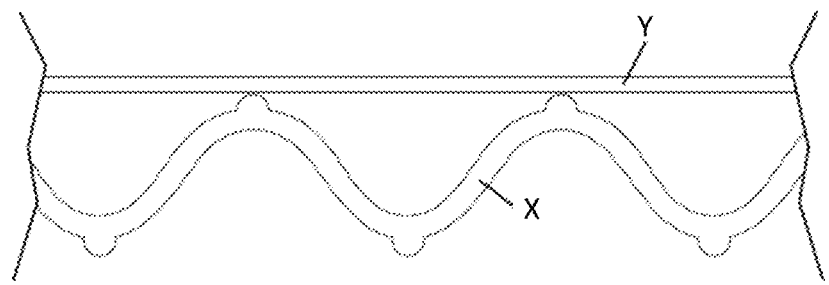
FIG. 28C is an end view of a portion of an alternative media pack that can be used in the air cleaner assembly of the present disclosure.

In FIG. 28C, a still further variation of such a principle is shown between a fluted sheet X and a facing sheet Y. These are meant to help understand how a wide variety of approaches are possible.

Figure 29:
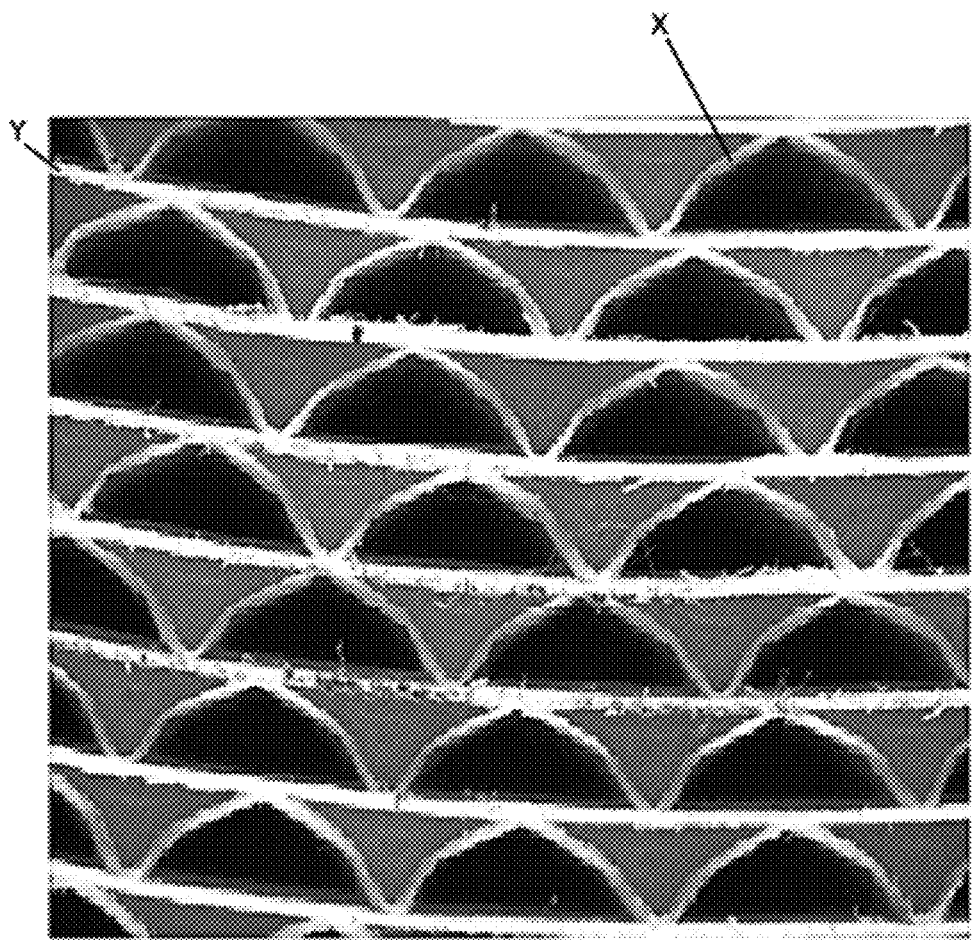
FIG. 29 is an end view of a portion of an alternative media pack that can be used in the air cleaner assembly of the present disclosure.

In FIG. 29, still another possible variation in fluted sheet X and facing sheet Y is shown.

Figure 30:
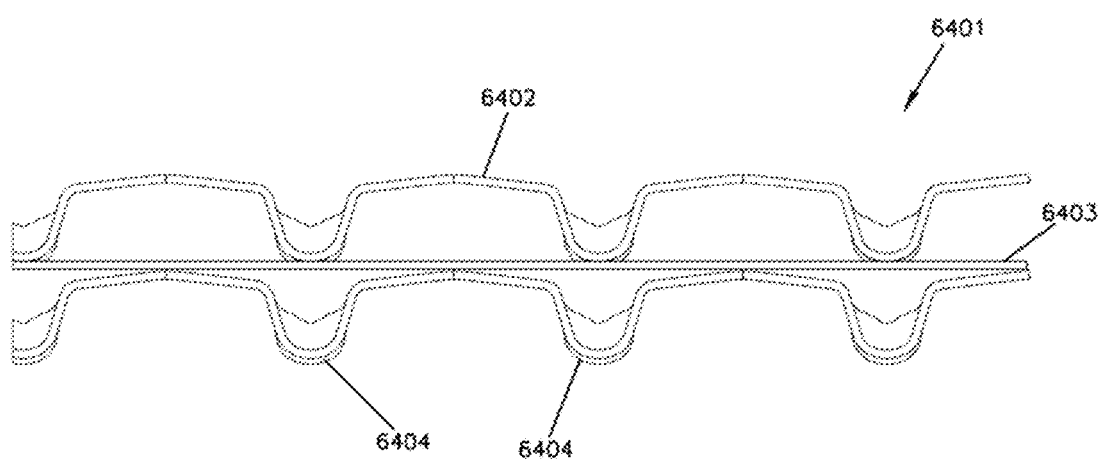
FIG. 30 is an end view of a portion of an alternative media pack that can be used in the air cleaner assembly of the present disclosure.
Figure 31:
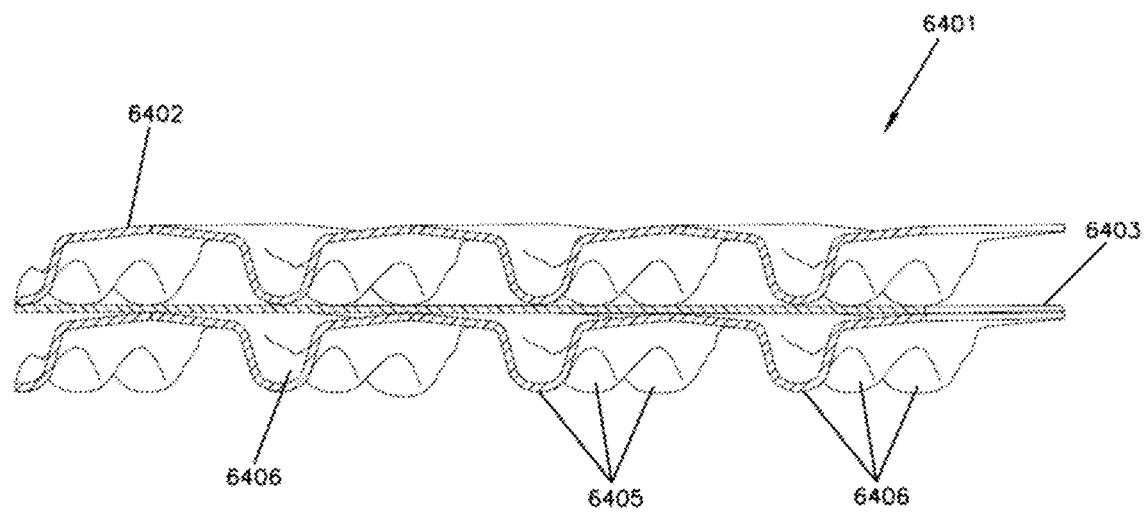
FIG. 31 is an end view of a portion of an alternative media pack that can be used in the air cleaner assembly of the present disclosure.

In FIGS. 30 and 31, an example media arrangement 6401 is depicted, in which a fluted sheet 6402 is secured to a facing sheet 6403. The facing sheet 6403 may be a flat sheet. The media arrangement 6401 can then be stacked or coiled into a media pack, with seals along opposite edges of the type previously described herein. In the embodiment shown, the flutes 6404 of fluted sheet 6402 have an undulating ridgeline including a series of peaks 6405 and saddles 6406. The peaks 6405 of adjacent flutes 6404 can be either aligned as shown in FIGS. 30 and 31 or offset. Further the peak height and/or density can increase, decrease, or remain constant along the length of the flutes 6404. The ratio of the peak flute height to saddle flute height can vary from about 1.5 to 1 to 1.1 to about 1.

It is noted that there is no specific requirement that the same media be used for the fluted sheet section and the facing sheet section. A different media can be desirable in each, to obtain different effects. For example, one may be a cellulose media, while the other is a media containing some non-cellulose fiber. They may be provided with different porosity or different structural characteristics, to achieve desired results.

Many of the techniques characterized herein will preferably be applied when the media is oriented for filtering between opposite flow ends of the cartridge is media having flutes or pleat tips that extend in a direction between those opposite ends. However, alternatives are possible. The techniques characterized herein with respect to seal arrangement definition can be applied in filter cartridges that have opposite flow ends, with media positioned to filter fluid flow between those ends, even when the media does not include flutes or pleat tips extending in a direction between those ends. The media, for example, can be depth media, can be pleated in an alternate direction, or it can be a non-pleated material.

The techniques characterized herein can be used with cartridges that are relatively deep in extension between flow ends, usually at least 100 mm, typically at least 150 mm, often at least 200 mm, sometimes at least 250 mm, and in some instances 300 mm or more, and are configured for large loading volume during use. These types of systems will typically be ones in which the media is configured with pleat tips or flutes extending in a direction between opposite flow ends.

Selected Characterizations

1. An air filter cartridge comprising: a) a media pack configured for installation into an air cleaner housing, the media pack extending along a longitudinal axis between opposite inlet and outlet flow ends, the media pack defining an outer perimeter; b) a circumferential shell surrounding at least a portion of the media pack outer perimeter, the circumferential shell including at least one engagement surface for receiving a closing force from an external component of the housing, the engagement surface being generally disposed orthogonally to the media pack outlet face; and c) a seal arrangement circumscribing at least a portion of the circumferential shell, the seal arrangement being generally disposed at an oblique angle to the engagement surface such that a component of the closing force causes the seal arrangement to form a seal against a sealing component of the air cleaner housing. 2. The air filter cartridge of claim 1, wherein the media pack includes fluted media. 3. The air filter cartridge of claim 1 or 2, wherein the oblique angle is between about 5 degrees and 20 degrees. 4. The air filter cartridge of any of claims 1-4, wherein the seal arrangement is aligned along a first plane. 5. The air filter cartridge of any of claims 1-3, wherein the seal arrangement is mounted to a flange member of the circumferential shell. 6.

The air filter cartridge of claim 5, wherein the shell extends to the flange member of the circumferential shell. 7. The air filter cartridge of any of claims 1-6, wherein the seal member defines the furthest distal end of the filter cartridge proximate the media pack outlet flow end. 8. An air filter cartridge comprising: a) a media pack configured for installation into an air cleaner housing, the media pack extending along a longitudinal axis between opposite inlet and outlet flow ends, the media pack defining an outer perimeter; b) a circumferential shell surrounding at least a portion of the media pack outer perimeter; and c) a seal arrangement circumscribing at least a portion of the circumferential shell, wherein a portion of the seal arrangement extends beyond a first plane defined by the media pack outlet flow end and a portion of the seal arrangement is disposed between the first plane and a second plane defined by the media pack inlet flow end. 9. The air filter cartridge of claim 8, wherein the seal arrangement is aligned along a third plane, the third plane being disposed at an oblique angle to the first and second planes. 10. The air filter cartridge of claim 9, wherein the first plane is between about 5 degrees and 20 degrees. 11. The air filter cartridge of any of claims 8-10, wherein the media pack includes fluted media. 12. The air filter cartridge of any of claims 8-11, wherein the seal arrangement is mounted to a flange member of the circumferential shell. 13. The air filter cartridge of claim 12, wherein the shell extends to the flange member of the circumferential shell. 14. The air filter cartridge of any of claims 8-13, wherein the seal member defines the furthest distal end of the filter cartridge proximate the media pack outlet flow end. 15. An air filter cartridge comprising: a) a media pack configured for installation into an air cleaner housing, the media pack extending along a longitudinal axis between opposite inlet and outlet flow ends, the media pack defining an outer perimeter; and b) an engagement surface for receiving a closing force from an external component of the housing, the engagement surface being generally disposed orthogonally to the media pack outlet face; c) a seal arrangement circumscribing the media pack outer perimeter, the seal arrangement being generally disposed at an oblique angle to the engagement surface. 16. An air filter cartridge comprising: a) a media pack configured for installation into an air cleaner housing, the media pack extending along a longitudinal axis between opposite inlet and outlet flow ends, the media pack defining an outer perimeter; and b) an engagement surface for receiving a closing force from an external component of the housing, the engagement surface being generally disposed orthogonally to the media pack outlet face; c) a seal arrangement circumscribing the media pack outer perimeter, the seal arrangement being arranged in a non-parallel relationship to the media pack outlet face. 17. An air filter cartridge comprising: a) a media pack configured for installation into an air cleaner housing, the media pack extending along a longitudinal axis between opposite inlet and outlet flow ends, the media pack defining an outer perimeter; and b) an engagement surface for receiving a closing force from an external component of the housing; c) a seal arrangement circumscribing the media pack outer perimeter, the seal arrangement being arranged at an orientation that is non-parallel and non-orthogonal to the engagement surface. 18. An air filter cartridge comprising: a) a media pack configured for installation into an air cleaner housing, the media pack extending along a longitudinal axis between opposite inlet and outlet flow ends, the media pack defining an outer perimeter; b) a seal arrangement circumscribing the media pack outer perimeter, wherein a portion of the seal arrangement extends beyond a first plane defined by the media pack outlet flow end and a portion of the seal arrangement is disposed between the first plane and a second plane defined by the media pack inlet flow end. 19. An air filter assembly comprising: a) a housing having a perimeter wall defining an interior region extending between an air inlet and an air outlet along a longitudinal axis, the housing including: i. a sealing surface extending around the perimeter wall; b) an air filter cartridge disposed within the housing interior region, the air filter cartridge including: i. a media pack installed into the housing interior region, the media pack extending along a longitudinal axis between opposite inlet and outlet flow ends, the media pack defining an outer perimeter; ii. a circumferential shell surrounding at least a portion of the media pack outer perimeter, the circumferential shell including at least one engagement surface for receiving a closing force from an external component of the housing, the engagement surface being generally disposed orthogonally to the media pack outlet face; and iii. a seal arrangement circumscribing at least a portion of the circumferential shell and being in sealing engagement with the housing first sealing surface, the seal arrangement being generally disposed at an oblique angle to the engagement surface such that a component of the closing force causes the seal arrangement to form a seal against a sealing component of the air cleaner housing. 20. An air filter assembly comprising: a) a housing having a perimeter wall defining an interior region extending between an air inlet and an air outlet along a longitudinal axis, the housing including: i. a sealing surface extending around the perimeter wall; b) an air filter cartridge disposed within the housing interior region, the air filter cartridge including: i. a media pack installed within the housing interior region, the media pack extending along a longitudinal axis between opposite inlet and outlet flow ends, the media pack defining an outer perimeter; ii. a circumferential shell surrounding at least a portion of the media pack outer perimeter; and iii. a seal arrangement circumscribing at least a portion of the circumferential shell and being in sealing engagement with the housing first sealing surface, wherein a portion of the seal arrangement extends beyond a first plane defined by the media pack outlet flow end and a portion of the seal arrangement is disposed between the first plane and a second plane defined by the media pack inlet flow end. 21. An air filter assembly comprising: a) a housing having a perimeter wall defining an interior region extending between an air inlet and an air outlet along a longitudinal axis, the housing including: i. a sealing surface extending around the perimeter wall, the sealing surface being disposed at an oblique angle to the longitudinal axis; ii. an access opening in the perimeter wall; b) an air filter cartridge installed within the housing interior region through the perimeter wall access opening, the air filter cartridge including: i. a media pack extending along a longitudinal axis between opposite inlet and outlet flow ends, the media pack defining an outer perimeter; ii. a seal arrangement circumscribing at least a portion of the media pack and being in sealing engagement with the housing first sealing surface. 22. An air filter assembly comprising: a) a housing having a perimeter wall defining an interior region extending between an air inlet and an air outlet along a longitudinal axis, the housing including a sealing surface and an access opening in the perimeter wall; b) an air filter cartridge installed through the housing access opening into the housing interior region, the air filter cartridge including: i. a media pack of the housing, the media pack defining an outer perimeter extending between opposite inlet and outlet flow ends; ii. a seal member circumscribing at least a portion of the media pack and being in sealing engagement with the housing sealing surface, wherein a first segment of the seal member is closer to the housing air outlet than a second segment of the seal member. 23. An side or top load air filter assembly comprising: a) a housing having a perimeter wall defining an interior region extending between an air inlet and an air outlet along a longitudinal axis, the housing including and an access opening in the perimeter wall; b) an air filter cartridge installed through the housing access opening into the housing interior region, the air filter cartridge including: i. a media pack of the housing, the media pack defining an outer perimeter extending between opposite inlet and outlet flow ends; ii. a seal member circumscribing at least a portion of the media pack and being disposed at an oblique angle to the outlet flow end. 24. The air filter cartridge or air filter assembly of any of the preceding claims, wherein the media pack includes fluted media. 25. The air filter cartridge or air filter assembly of any of the preceding claims, wherein the oblique angle is between about 5 degrees and 20 degrees. 26. The air filter cartridge or air filter assembly of any of the preceding claims, wherein the seal arrangement is aligned along a first plane. 27. The air filter cartridge or air filter assembly of any of the preceding claims, wherein the seal arrangement is mounted to a flange member of the circumferential shell. 28. The air filter cartridge or air filter assembly of any of the preceding claims, wherein the shell extends to the flange member of the circumferential shell. 29. The air filter cartridge or air filter assembly of any of the preceding claims, wherein the seal member defines the furthest distal end of the filter cartridge proximate the media pack outlet flow end. 31. The air filter cartridge or air filter assembly of any of the preceding claims, further comprising: a) a circumferential shell surrounding at least a portion of the media pack outer perimeter, the circumferential shell including at least one engagement surface for receiving a closing force from a lock mechanism of the air filter assembly, the engagement surface being generally disposed orthogonally to the media pack outlet face; and b) wherein the seal arrangement is generally disposed at an oblique angle to the engagement surface such that a component of the closing force causes the seal arrangement to form a seal against a sealing component of the air cleaner housing. 32. The air filter cartridge or air filter assembly of any of the preceding claims, wherein the oblique angle is between 5 degrees and 20 degrees. 33. The air filter cartridge or air filter assembly of any of the preceding claims, wherein the media pack includes fluted media. 34. The air filter cartridge or air filter assembly of any of the preceding claims, wherein the seal member defines the furthest distal end of the filter cartridge proximate the media pack outlet flow end.

Again, the principles, techniques, and features described herein can be applied in a variety of systems, and there is no requirement that all of the advantageous features identified be incorporated in an assembly, system or component to obtain some benefit according to the present disclosure.

What is claimed is:

1. A side-load air filter cartridge comprising:
a media pack configured for installation into a side opening of an air cleaner housing, the media pack extending along a longitudinal axis between opposite inlet and outlet flow ends, the media pack defining an outer perimeter with opposite straight sides joined by a first curved end;
a seal arrangement circumscribing the media pack outer perimeter and including opposite straight sides joined by a first curved end arranged about the media pack outer perimeter, wherein a portion of the seal arrangement extends beyond a first plane defined by the media pack outlet flow end and a portion of the seal arrangement is disposed between the first plane and a second plane defined by the media pack inlet flow end, wherein the seal arrangement is aligned along a third plane, the third plane being disposed at an oblique angle to the first and second planes;
a circumferential shell surrounding at least a portion of the media pack outer perimeter, wherein the circumferential shell supports the seal arrangement, the circumferential shell including at least one engagement surface for directly engaging with an external component of the air cleaner housing to secure the air filter cartridge within the air cleaner housing, the at least one engagement surface being disposed orthogonally to the media pack outlet flow end and at an oblique angle to a sealing surface of the seal arrangement, wherein when a clamping force directed orthogonally to the at least one engagement surface is exerted onto the at least one engagement surface, a component sealing force is generated in the direction of the sealing surface.

2. The air filter cartridge of claim 1, wherein the first plane is between about 5 degrees and 20 degrees.

3. The air filter cartridge of claim 1, wherein the media pack includes fluted media.

4. The air filter cartridge of claim 1, wherein the seal arrangement defines a furthest distal end of the air filter cartridge proximate the media pack outlet flow end.

5. The air filter cartridge of claim 1, wherein the circumferential shell includes at least one surface for receiving a closing force from an external component of the housing, the at least one surface being generally disposed orthogonally to the media pack outlet flow end.

6. The air filter cartridge of claim 1, wherein the media pack includes a second curved end opposite the media pack first curved end.

7. The air filter cartridge of claim 1, wherein the at least one engagement surface is located proximate a second curved end of the media pack, the second curved end being opposite the media pack first curved end.

8. The air filter cartridge of claim 1, wherein the at least one engagement surface is integrally formed with the circumferential shell.

9. The air filter cartridge of claim 1, wherein the seal arrangement has oppositely facing first and second axial surfaces, and is mounted to a flange member of the circumferential shell such that the first axial surface is presented as a sealing surface and the second axial surface is adjacent to and supported by the flange member.

10. The air filter cartridge of claim 9, wherein the circumferential shell terminates at the flange member.

11. The air filter cartridge of claim 9, wherein the flange member and the seal arrangement each include a curved segment circumscribing the first curved end of the media pack.

12. An air filter assembly comprising:
a housing having a perimeter wall defining an interior region extending between an air inlet and an air outlet along a longitudinal axis, the housing including a sealing surface located between the air inlet and the air outlet, the housing including an access opening in the perimeter wall; and
the side-load air filter cartridge of claim 8 installed through the housing access opening into the housing interior region.

* * * * *